US012701023B1

(12) United States Patent　　　　(10) Patent No.:　US 12,701,023 B1

Gu et al.　　　　　　　　　　　　(45) Date of Patent:　　　Aug. 4, 2026

(54) ANNOTATING A CONFERENCE VIDEO STREAM WITH PARTICIPANT NAMES USING SPEECH RECOGNITION

(71) Applicant: Zoom Communications, Inc., San Jose, CA (US)

(72) Inventors: Zhenghang Gu, San Jose, CA (US); Zhaofeng Jia, Saratoga, CA (US); Robert Aaron Klegon, Chicago, IL (US); Tiffany Hui Lai, Seattle, WA (US); Cynthia Eshiuan Lee, Austin, TX (US); Bo Ling, Saratoga, CA (US); Ka Ki Ng, San Mateo, CA (US); Jing-An Tzeng, San Jose, CA (US); Zhenyi Ye, Aliso Viejo, CA (US); Huixi Zhao, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/461,172

(22) Filed: Sep. 5, 2023

(51) Int. Cl.
　　*H04L 12/18*　　　　(2006.01)
　　*G06F 21/32*　　　　(2013.01)
　　*G10L 17/04*　　　　(2013.01)

(52) U.S. Cl.
　　CPC .......... *H04L 12/1822* (2013.01); *G06F 21/32* (2013.01); *G10L 17/04* (2013.01); *G06F 2221/2117* (2013.01); *G06F 2221/2143* (2013.01)

(58) Field of Classification Search
　　None
　　See application file for complete search history.

(56) References Cited

U.S. PATENT DOCUMENTS

| | | | |
|---|---|---|---|
| 5,483,587 | A | 1/1996 | Hogan et al. |
| 8,311,292 | B2 | 11/2012 | Tian et al. |
| 8,593,501 | B1 | 11/2013 | Kjeldaas |
| 8,819,129 | B1 | 8/2014 | Cyriac et al. |
| 9,613,448 | B1 | 4/2017 | Margolin |
| 9,959,014 | B2 | 5/2018 | Thelin et al. |
| 10,771,694 | B1 | 9/2020 | Geng et al. |
| 10,867,610 | B2 | 12/2020 | Diamant et al. |

(Continued)

*Primary Examiner* — Mohamed Ibrahim
(74) *Attorney, Agent, or Firm* — Young Basile Hanlon & MacFarlane, P.C.

(57) ABSTRACT

A conference video stream is annotated with participant names determined using speech recognition. A computing device used with a video conference obtains voiceprints representing speech of individual conference participants invited to the video conference. The computing device obtains, as output of a speech recognition process performed based on the voiceprints, name information of a conference participant whose speech is represented within an audio segment captured during the video conference. The computing device outputs an annotation representing the name information to configure one or more participant devices connected to the video conference to display the name information proximate to a depiction of the conference participant within a video stream depicting the conference participant. The voiceprints representing the speech of the individual conference participants are uploaded to a data store prior to the video conference as part of an enrollment and authorization process performed by the individual conference participants.

20 Claims, 15 Drawing Sheets

(56)  References Cited

U.S. PATENT DOCUMENTS

| | | | |
|---|---|---|---|
| 10,972,655 | B1 | 4/2021 | Ostap et al. |
| 11,165,597 | B1 | 11/2021 | Matsuguma et al. |
| 11,417,343 | B2 | 8/2022 | Cohen et al. |
| 11,451,746 | B1 | 9/2022 | Graybill et al. |
| 11,935,168 | B1* | 3/2024 | Akmal .................... G10L 15/26 |
| 2002/0023133 | A1 | 2/2002 | Kato et al. |
| 2004/0091086 | A1* | 5/2004 | Ortel ....................... H04M 3/56 |
| | | | 379/88.02 |
| 2004/0095507 | A1 | 5/2004 | Bishop et al. |
| 2005/0102502 | A1 | 5/2005 | Sagen |
| 2009/0210491 | A1 | 8/2009 | Thakkar et al. |
| 2010/0149305 | A1 | 6/2010 | Catchpole et al. |
| 2012/0045093 | A1 | 2/2012 | Salminen et al. |
| 2013/0162752 | A1* | 6/2013 | Herz ........................ H04N 7/15 |
| | | | 348/E7.083 |
| 2013/0321123 | A1 | 12/2013 | Wan |
| 2015/0189233 | A1 | 7/2015 | Carpenter et al. |
| 2016/0284354 | A1* | 9/2016 | Chen ........................ H04N 7/15 |
| 2018/0342251 | A1 | 11/2018 | Cohen et al. |
| 2019/0205685 | A1 | 7/2019 | Hara |
| 2019/0205695 | A1 | 7/2019 | Yan et al. |
| 2019/0215464 | A1 | 7/2019 | Kumar et al. |
| 2019/0341050 | A1* | 11/2019 | Diamant .............. G06V 40/172 |
| 2019/0341055 | A1 | 11/2019 | Krupka et al. |
| 2020/0295959 | A1 | 9/2020 | Fukasawa |
| 2020/0358628 | A1 | 11/2020 | Achyuth et al. |
| 2021/0225380 | A1* | 7/2021 | Wang ....................... G10L 17/04 |
| 2022/0091810 | A1 | 3/2022 | Warner |
| 2022/0303314 | A1 | 9/2022 | Wu et al. |
| 2022/0345665 | A1 | 10/2022 | Gronau et al. |
| 2022/0377177 | A1 | 11/2022 | Tadge |
| 2023/0007060 | A1 | 1/2023 | Matsuura |
| 2024/0045574 | A1 | 2/2024 | Nagpal et al. |
| 2024/0064271 | A1 | 2/2024 | Murata |
| 2024/0154833 | A1 | 5/2024 | Zotto et al. |

* cited by examiner

600

602
FIRST PARTICIPANT DEVICE 614
604
MEDIA PROCESSING
SERVER DEVICE

606
DATA STORE DEVICE
612
PARTICIPANT MEDIA 616
608
PARTICIPANT RECOGNITION
618
ANNOTATION GENERATION
COMPUTING DEVICE

610
SECOND PARTICIPANT DEVICE

NAME LABELING ENROLLMENT AND AUTHORIZATION

[X] ALLOW THE VIDEO CONFERENCING SYSTEM TO RECOGNIZE ME WHEN I AM IN A VIDEO CONFERENCE TO ADD MY NAME LABEL INTO THE CONFERENCE VIDEO STREAM

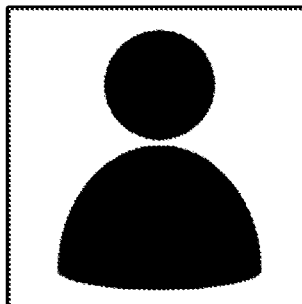

USE MY PROFILE PHOTO

TAKE A PHOTO

UPLOAD ANOTHER PHOTO

FIG. 9A

NAME LABELING ENROLLMENT AND AUTHORIZATION

[X] ALLOW THE VIDEO CONFERENCING SYSTEM TO RECOGNIZE ME WHEN I AM IN A VIDEO CONFERENCE TO ADD MY NAME LABEL INTO THE CONFERENCE VIDEO STREAM

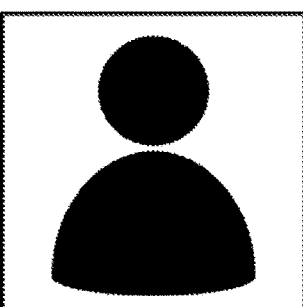

USE MY VOICEPRINT

RECORD A VOICEPRINT

UPLOAD ANOTHER VOICEPRINT

FIG. 9B

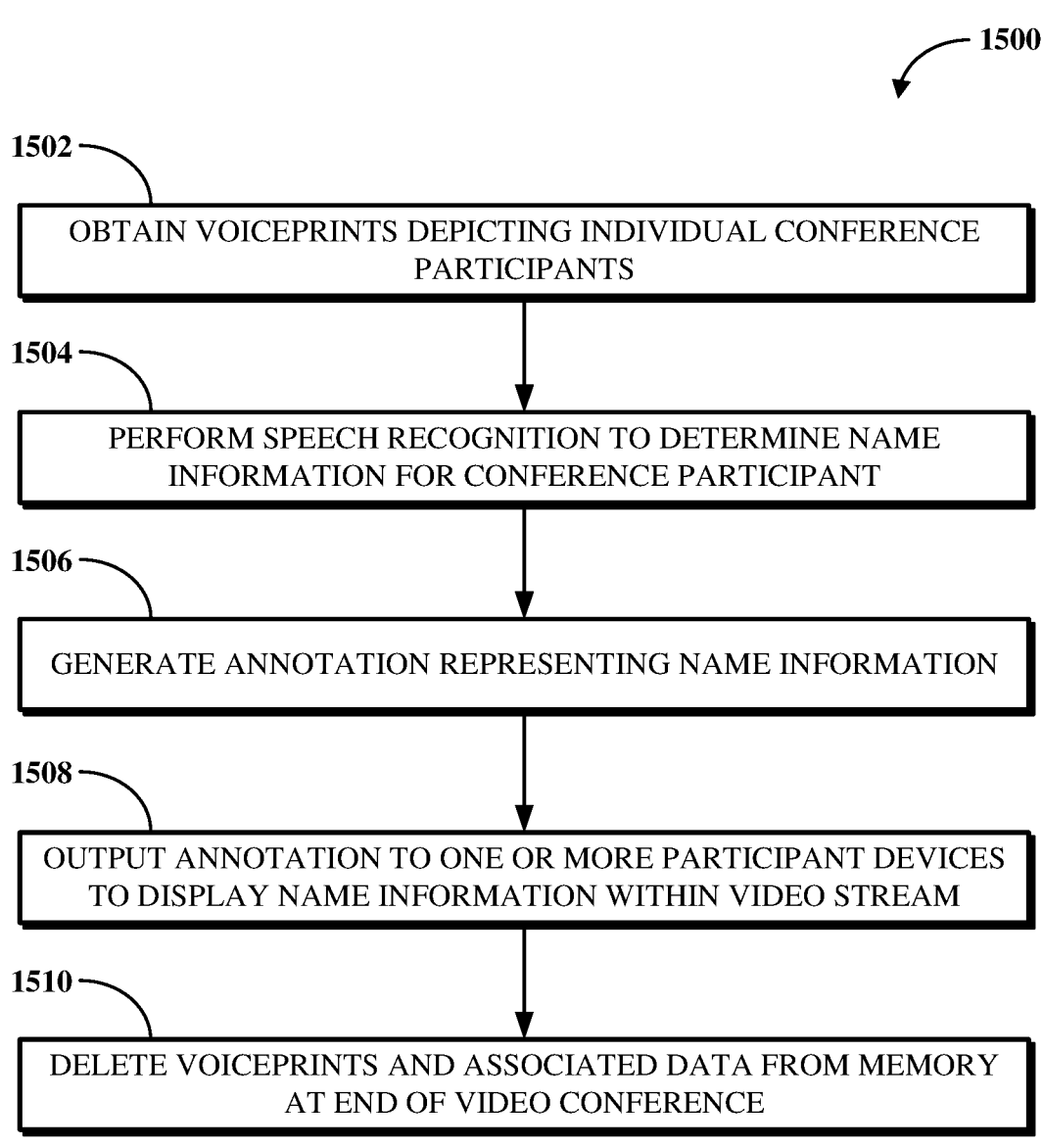

1500

1502 ——

OBTAIN VOICEPRINTS DEPICTING INDIVIDUAL CONFERENCE PARTICIPANTS

1504 ——

PERFORM SPEECH RECOGNITION TO DETERMINE NAME INFORMATION FOR CONFERENCE PARTICIPANT

1506 ——

GENERATE ANNOTATION REPRESENTING NAME INFORMATION

1508 ——

OUTPUT ANNOTATION TO ONE OR MORE PARTICIPANT DEVICES TO DISPLAY NAME INFORMATION WITHIN VIDEO STREAM

1510 ——

DELETE VOICEPRINTS AND ASSOCIATED DATA FROM MEMORY AT END OF VIDEO CONFERENCE

FIG. 15

ANNOTATING A CONFERENCE VIDEO STREAM WITH PARTICIPANT NAMES USING SPEECH RECOGNITION

FIELD

This disclosure generally relates to conference video stream annotation, and, more specifically, to systems and techniques for determining name information for individual participants of a video conference and outputting annotations representing that name information to other participants of the video conference.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 9A-B are illustrations of examples of enrollment and authorization forms used to obtain participant consent for participant recognition during video conferences.

FIG. 15 is a flowchart of an example of a technique for annotating a conference video stream with participant names using speech recognition.

DETAILED DESCRIPTION

Figure 1:
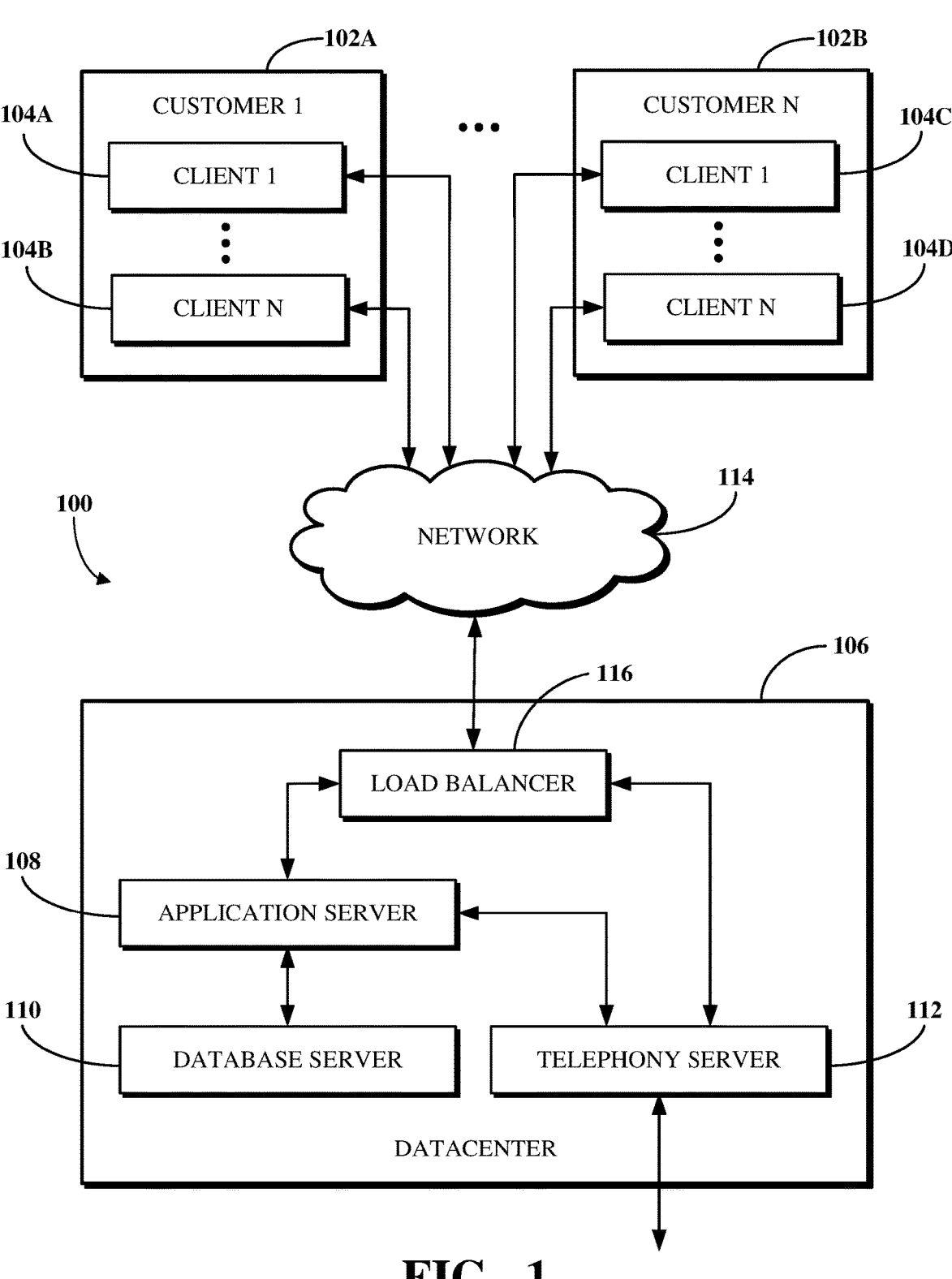
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

In some cases, a physical space (e.g., a conference room or office) may be equipped with a software-based room system to provide an integrated video conferencing experience for conference participants within the physical space. Conventional software-based room systems use a computing device, such as a desktop or laptop computer, to run software for configuring other devices (e.g., one or more cameras and display) of the physical space for use with video conferences. The computing device is also used to connect to server-side conferencing software that facilitates such video conferences to enable anyone in the physical space to participate in a video conference with participants attending from locations other than the physical space, for example, via the configured other devices. In a simple use case, a single display and a single camera of the physical space may be used. In more complex use cases, multiple displays and/or multiple cameras of the physical space may be used.

A video conference may be attended by one or more participants located within such a physical space made available for use during the video conference (hereinafter referred to as "in-person participants") and one or more participants located other than at that physical space (hereinafter referred to as "remote participants"). Typically, the in-person participants to a video conference will connect to the video conference via a single computing device of the physical space they are in (i.e., a physical space computing device), while remote participants may connect to the video conference using their own computing devices (i.e., remote computing devices). Thus, while video streams from the remote computing devices may depict individual remote participants, a video stream from the physical space computing device will depict at least as many of the in-person participants as are within a field of view of a camera used by the physical space computing device to capture the video stream.

Conventional video conferencing systems enable participants to provide their own name information to be displayed to other participants of a video conference. For example, a graphical user interface (GUI) for a video conference may include multiple user interface tiles in which each user interface tile corresponds to and presents the video stream from an individual participant device (e.g., a physical space computing device or a remote computing device). The name information for a given participant is typically presented within the GUI in connection with the user interface tile showing their corresponding video stream. As such, video streams for individual remote participants may commonly be labeled with the names of those individual participants, while a video stream for in-person participants may commonly be collectively labeled based on the physical space they are in or the computing device thereof (e.g., "Conference Room 1").

However, these conventional approaches suffer from a significant drawback in that they are unable to present name information for individual participants appearing with others in a single video stream. For example, a video stream for a physical space computing device, as described above, may be labeled with name information corresponding to the physical space. The label thus does not indicate the name information for any given participant depicted in that video stream. In another example, a video stream for a remote computing device which depicts multiple remote participants may be labeled with name information for only one of those multiple remote participants, resulting in the other depicted participants not being named in the label for that video stream. In yet another example, even where a video stream is manually labeled with name information for each depicted participant, other participants (e.g., remote participants) who are unfamiliar with those depicted participants may be unable to know who is who amongst them.

Problems may arise when a first video conference participant does not know the name of a second video conference participant. For example, the first video conference participant may become embarrassed by their not knowing the name of the second video conference participant and limit their own participation in the video conference discussion, such as by not asking questions that could reveal their unfamiliarity with the second video conference participant. In another example, the first video conference participant may perceive a security concern based on their unfamiliarity with the second video conference participant and, as a result, limit or otherwise seek to limit the topics covered during the video conference. In yet another example, the first video conference participant may ask who the second video conference is to resolve the issue altogether, although this may introduce disruption to the video conference experience. In each such case, the technical design of conventional video conferencing systems may result in a diminished experience for at least some of the video conference participants. Furthermore, where a video conference is recorded, these issues also extend to the recording and thus result in the same diminished experience for at least some viewers of the conference recording.

Implementations of this disclosure address problems such as these by annotating a conference video stream with participant name information. In particular, the implementations of this disclosure describe processes enrollment and authentication processes by which users of conferencing software, as video conference participants, can consent to be recognized during a video conference to enable the generation and use of an annotation including their name information for the benefit of other video conference participants. The annotation for a given participant may be of various sizes, shapes, formats, etc. and represents the name information (e.g., first name, last name, nickname, or a combination thereof) for that given participant. The annotation is included in the video stream within which that given participant is depicted, generally in a location proximate to the depiction of the given participant within the video stream. Participant recognition can be performed using image processing and/or audio processing. To perform participant recognition using image processing, a facial recognition process is performed using an image previously obtained for the given participant (e.g., uploaded by the given participant before or at a beginning of the video conference) and one or more images from the video stream captured during the video conference and depicting the given participant. To perform participant recognition using audio processing, a speech recognition process is performed using a voiceprint previously obtained for the given participant (e.g., uploaded by the given participant before or at a beginning of the video conference) and audio captured during the video conference. In either case, high dimensional features of the previously obtained media are compared to high dimensional features of the media captured during the video conference to determine name information for the given participant. That name information is then used to generate an annotation which is then included in the video stream according to location instructions describing where in the video stream to place the annotation.

The implementations of this disclosure describe using a machine learning model for facial recognition and/or for speech recognition as part of the participant recognition and labeling process used to generate conference video stream annotations. A machine learning model as used herein may be or include one or more of a neural network (e.g., a convolutional neural network, recurrent neural network, or other neural network), decision tree, vector machine, Bayesian network, genetic algorithm, deep learning system separate from a neural network, or other machine learning model. As will be described below in detail, the machine learning model is trained with appropriate authorization using a commercially available dataset and not using data or media of users of a conference video stream annotation system or a software platform that uses same. Furthermore, and as will also be described below in detail, the machine learning model is used to process media only for those conference participants who have explicitly enrolled in, and thus provided authorization for, participant recognition and labeling.

To describe some implementations in greater detail, reference is first made to examples of hardware and software structures used to implement a conference video stream annotation system usable to annotate a conference video stream with participant names. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
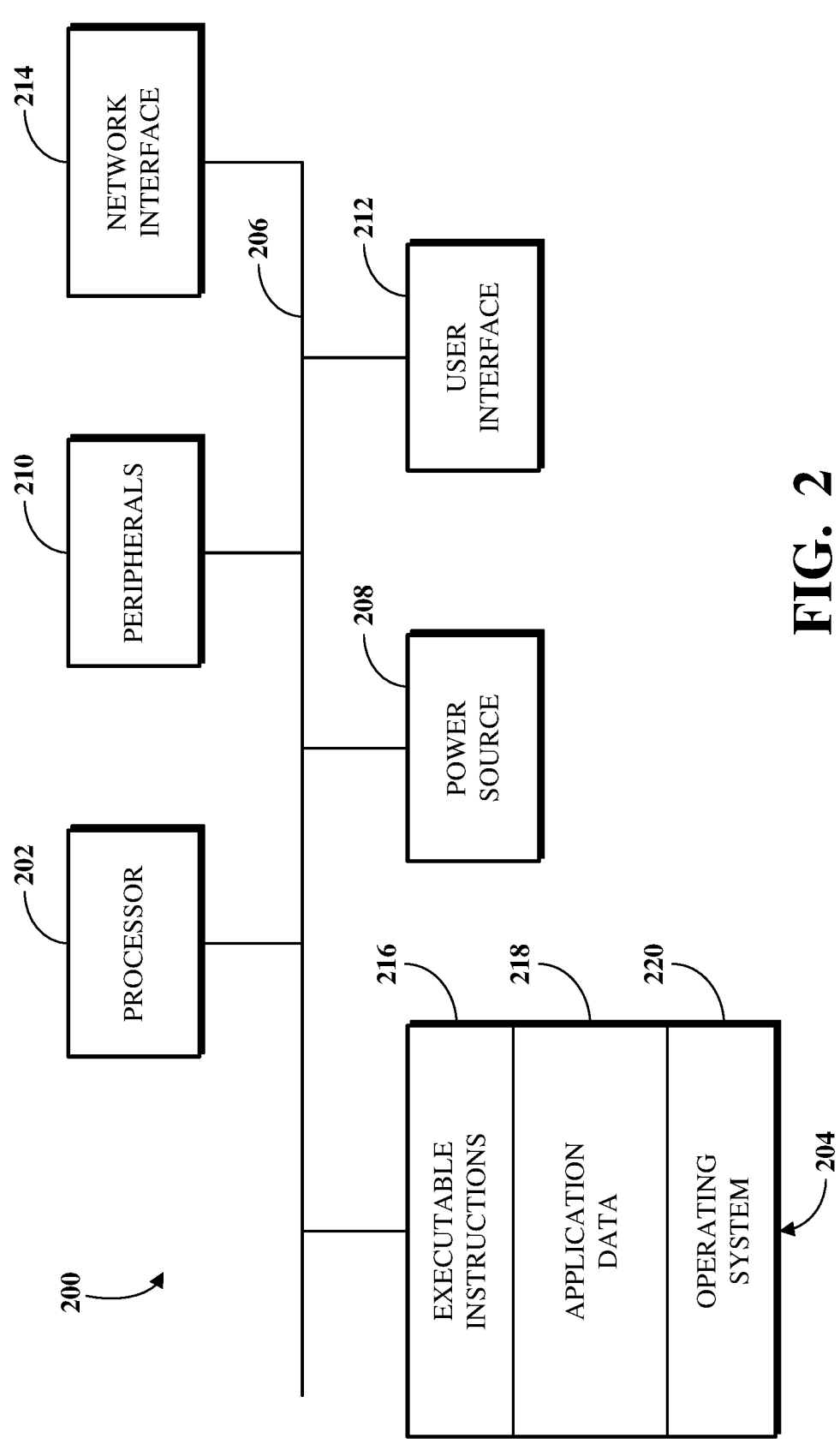
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
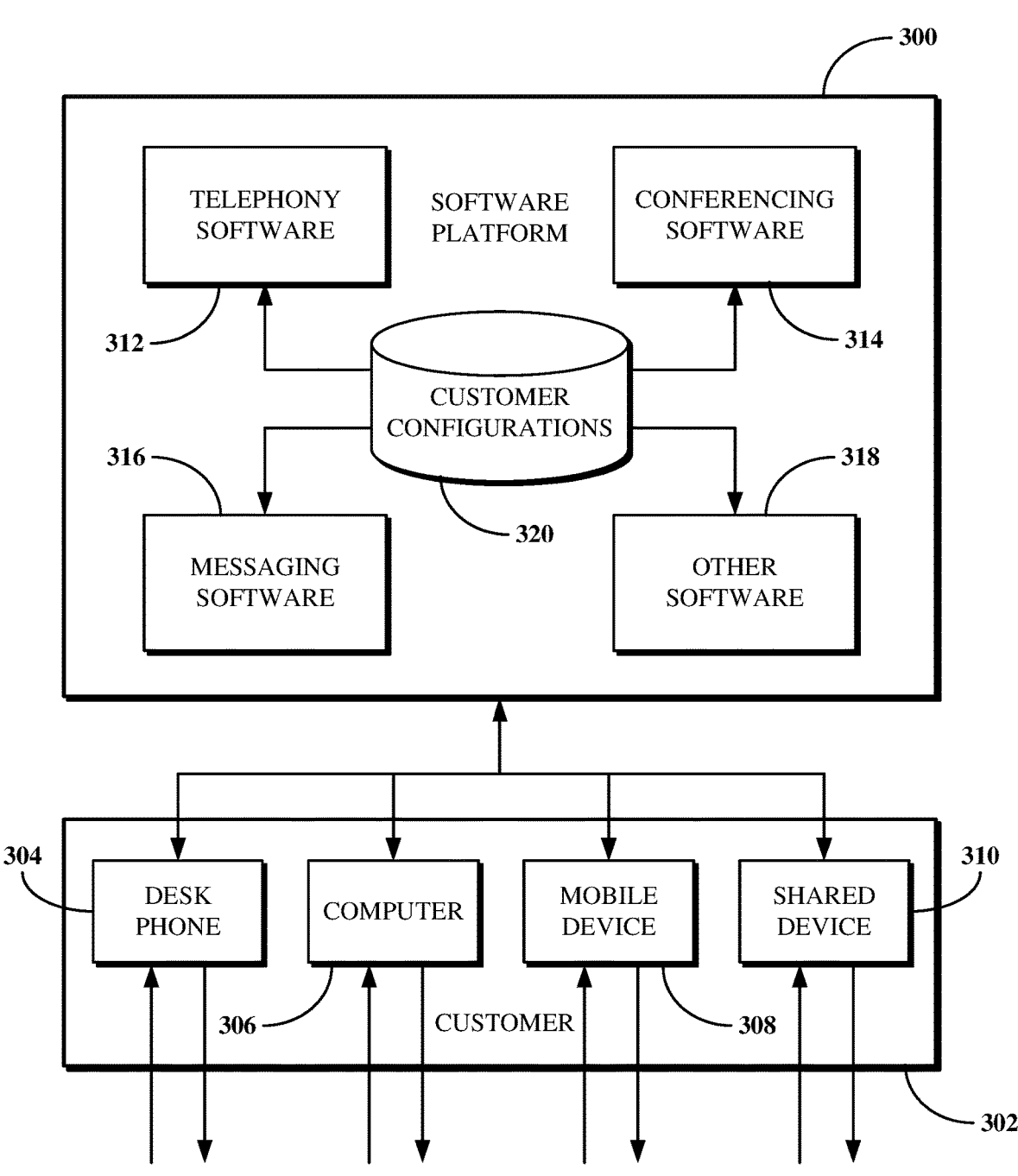
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for annotating a conference video stream with participant names as disclosed herein. In some such cases, the conferencing software 314 can include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
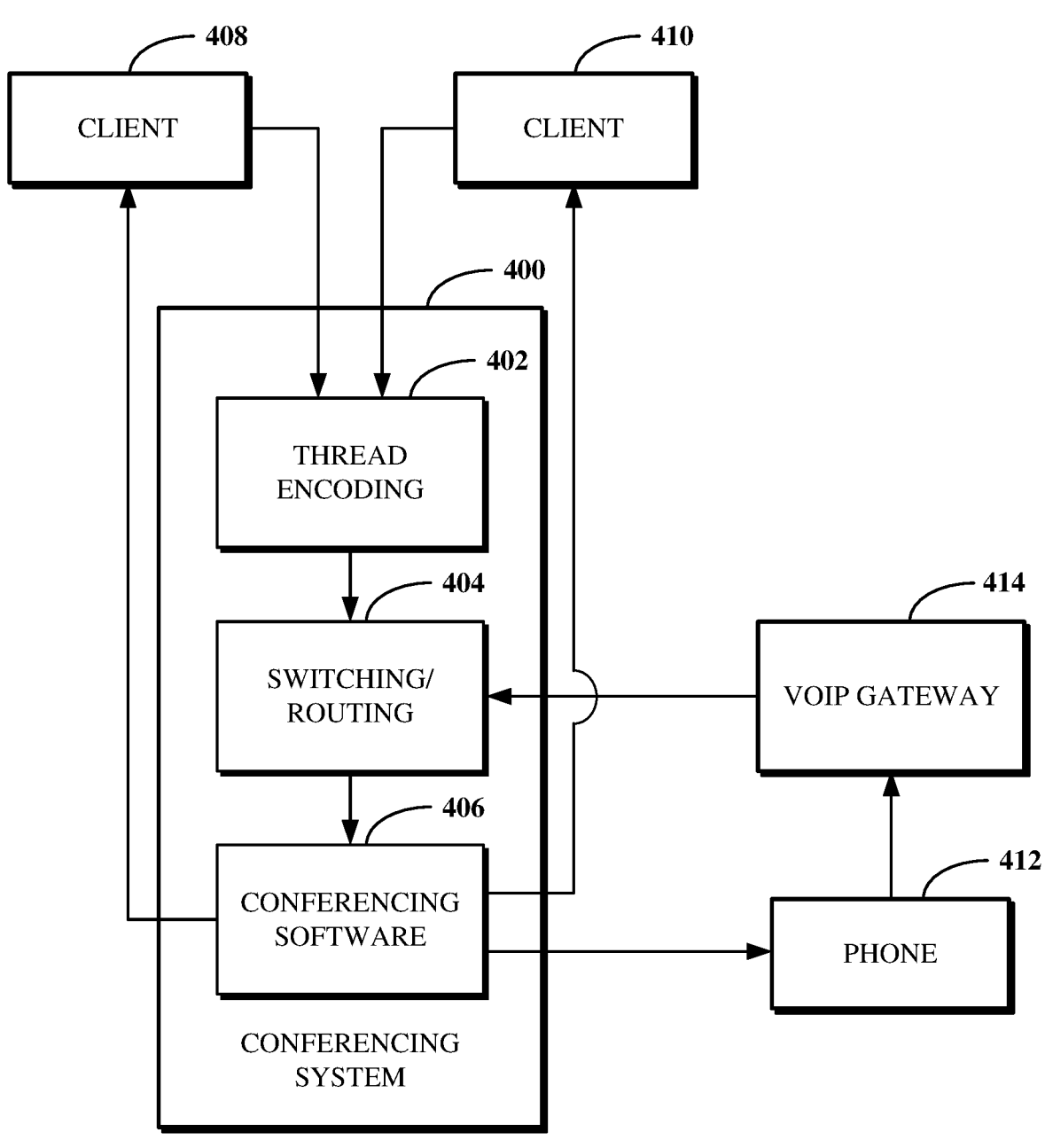
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may, for example, the conferencing software 314 shown in FIG. 3, is software for implementing conferences (e.g., video conferences) between users of clients and/or phones, such as clients 408 and 410 and phone 412. For example, the clients 408 or 410 may each be one of the clients 304 through 310 shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other numbers of clients and/or other numbers of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406. The various channels used for establishing connections between the clients 408 and 410 and the phone 412 may, for example, be based on the individual device capabilities of the clients 408 and 410 and the phone 412.

The conferencing software 406 includes a user interface tile for each input stream received and processed at the conferencing system 400. A user interface tile as used herein generally refers to a portion of a conferencing software user interface which displays information (e.g., a rendered video) associated with one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may, in some examples, be one of a gallery view in which all user interface tiles are similarly or identically sized and arranged in a generally grid layout, a speaker view in which one or more user interface tiles for active speakers are enlarged and arranged in a center position of the conferencing software user interface while the user interface tiles for other conference participants are reduced in size and arranged near an edge of the conferencing software user interface, or a combined speaker and gallery view. In some cases, the view style or one or more other configurations related to the display of user interface tiles may be based on a type of video conference implemented using the conferencing software 406 (e.g., a participant-to-participant video conference, a contact center engagement video conference, or an online learning video conference, as will be described below).

The content of the user interface tile associated with a given participant may be dependent upon the source of the input stream for that participant. For example, where a participant accesses the conferencing software 406 from a client, such as the client 408 or 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant access the conferencing software 406 from a phone, such as the phone 412, the user interface tile for the participant may be limited to a static image showing text (e.g., a name, telephone number, or other identifier associated with the participant or the phone 412) or other default background aspect since there is no video stream presented for that participant.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 direct the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients, such as within respective user interface tiles of a user interface of the conferencing software 406.

A user of the phone 412 participates in a conference using an audio-only connection and may be referred to an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining using clients turns on their video stream for any portion of the conference. In some cases, however, the conference may have video disabled, such as where each participant connects to the conference using a phone rather than a client, or where a host of the conference selectively configures the conference to exclude video functionality.

Figure 5:
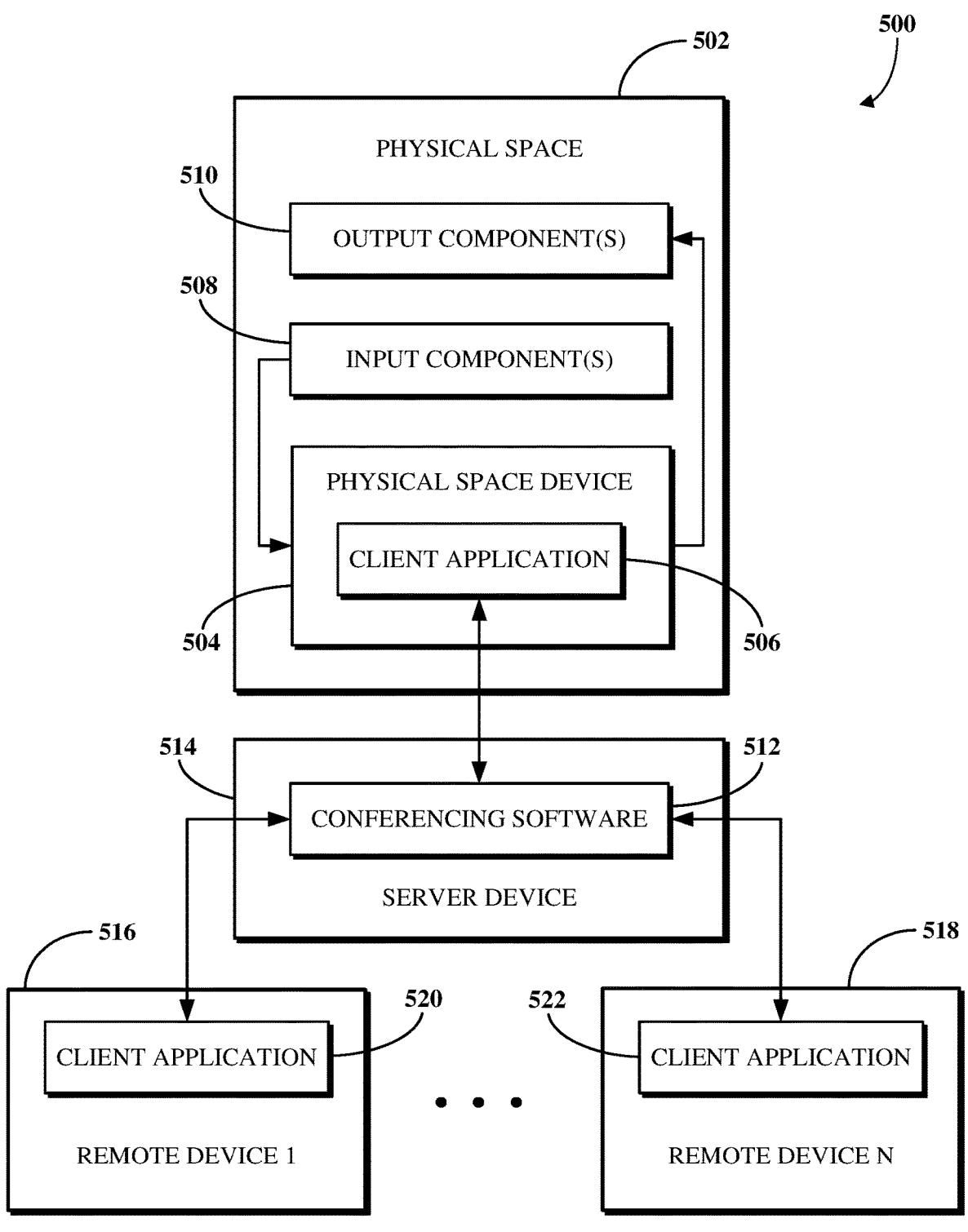
FIG. 5 is a block diagram of an example of a software-based room system for conferencing software services.

FIG. 5 is a block diagram of an example of a software-based room system 500 for conferencing software services, for example, the conferencing software services described with respect to FIGS. 3 and 4. The system 500 includes hardware and software components used to facilitate conferencing experiences within a physical space 502. The physical space 502 is an indoor or outdoor space within which one or more people may be physically located during some or all of a video conference. In one non-limiting example, the physical space 502 may be a conference room.

The physical space 502 includes a physical space device 504, which is a computing device that runs software including a client application 506 configured to connect the physical space device 504 to a video conference. For example, the physical space device 504 may be a client such as one of the clients 304 through 310 shown in FIG. 3 or one of the clients 408 through 410 shown in FIG. 4. While the physical space device 504 is shown as being located within the physical space 502, in some implementations, the physical space device 504 may instead be located external to but remain associated with the physical space 502. The physical space 502 also includes one or more input components 508 and one or more output components 510 usable in connection with a video conference. The one or more input components 508 may, for example, include one or more cameras, microphones, or sensors. The one or more output components 510 may, for example, include one or more displays.

The video conference which the client application 506 connects the physical space device 504 to is implemented by conferencing software 512 running at a server device 514, which may, for example, be a server used with the conferencing system 400 shown in FIG. 4. For example, the conferencing software 512 may be the conferencing software 314 shown in FIG. 3. The video conference is a video-enabled conference with two or more participants in which one or more of those participants are in the physical space 502 and one or more of those participants are remote participants located external to the physical space 502.

As shown, the remote participants connect the video conference via remote devices 1 516 through N 518, in which N is an integer greater than or equal to 2. Each of the remote devices 1 516 through N 518 is a computing device and may, for example, be one of the clients 304 through 310 or one of the clients 408 through 410. Where a single remote device is connected to the video conference, the remote device N 518 (as well as any other remote device other than the remote device 1 516) is omitted. As shown, each of the remote devices 1 516 through N 518 runs a client application 520 through 522, which are software configured to communicate with the conferencing software 512 to enable the users of the remote devices 1 516 through N 518 to participate in the video conference implemented using the conferencing software 512 as remote participants.

The one or more input components 508 capture input (e.g., video data) that is then transmitted to the conferencing software 512 for rendering within a user interface tile of a user interface of the video conference. For example, an input video stream from the physical space device 504 may be processed and output within a user interface tile associated with the physical space 502, and thus with the conference participants located thereat. Similarly, the remote devices 1 516 through N 518 each include one or more capture components, such as a camera, which capture input (e.g., video data) that is then transmitted to the conferencing software 512 for rendering within a user interface tile of a user interface of the video conference. For example, an input video stream from the remote device 1 516 may be processed and output within a user interface tile associated with the remote participant using the remote device 1 516 within the user interface of the video conference and an input video stream from the remote device N 518 may be processed and output within a user interface tile associated with the remote participant using the remote device N 518 within the user interface of the video conference.

In some implementations, one or more of the devices connected to the conferencing software 512 can connect to the video conference implemented by the conferencing software 512 other than by using a client application, such as the client applications 506 and 520 through 522. For example, the physical space device 504 and/or one or more of the remote devices 1 516 through N 518 may connect to the video conference using a web application running through a web browser. In another example, the physical space device 504 and/or one or more of the remote devices 1 516 through N 518 may connect to the video conference using a software application other than a web browser or a client application, for example, a non-client desktop or mobile application.

Figure 6:
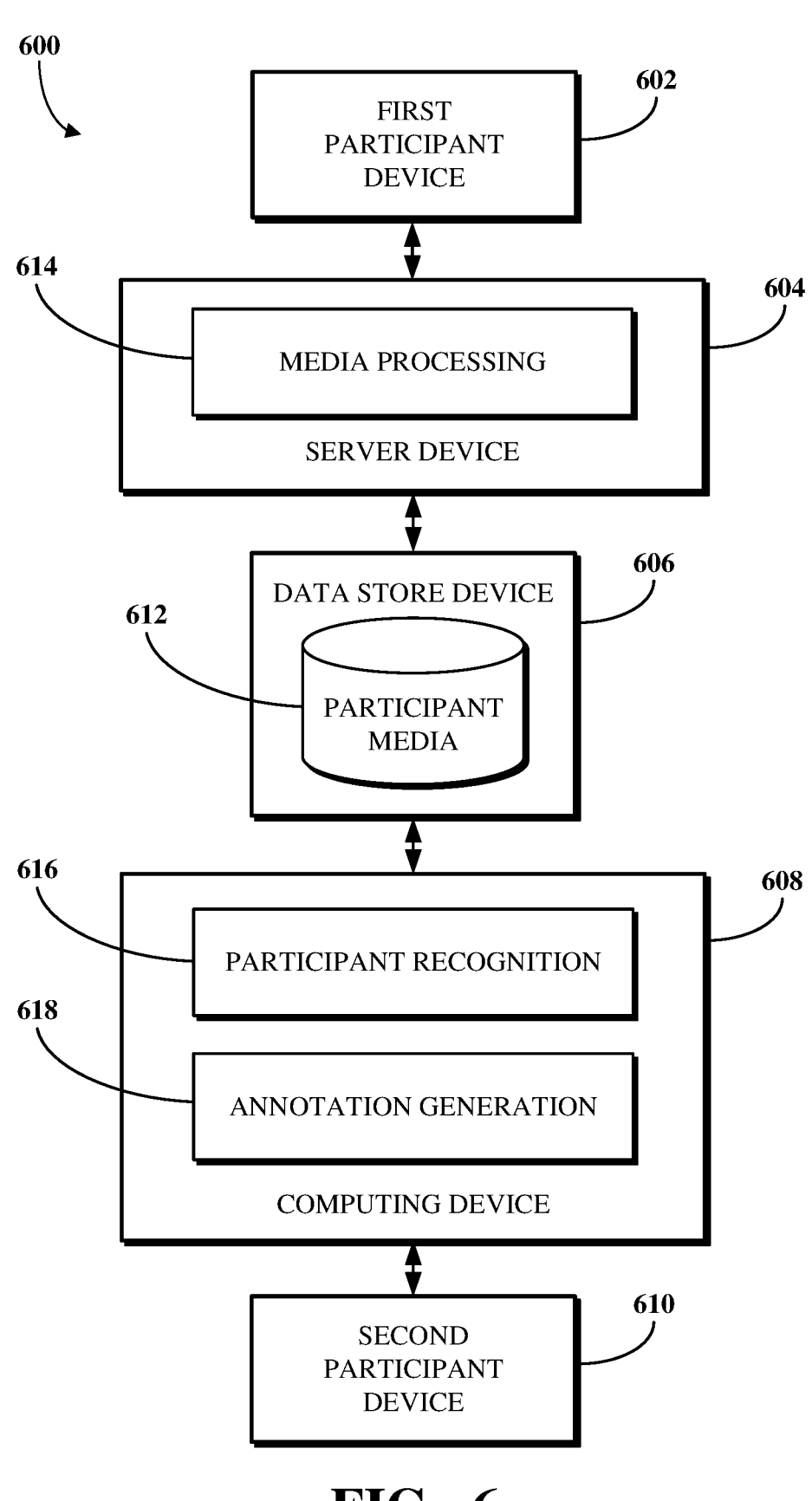
FIG. 6 is a block diagram of an example of a conference video stream annotation system.

FIG. 6 is a block diagram of an example of a conference video stream annotation system 600. The system 600 is used with a video conference implemented by a conferencing system, for example, the conferencing system 400 shown in FIG. 4. For example, the system 600 can be used for a video conference involving a software-based room system, such as the software-based room system 500 shown in FIG. 5, to deliver content (e.g., annotations representing name information of conference participants) to devices connected to the video conference. The system 600 includes various devices used in connection with a video conference and/or steps preceding such a video conference. In particular, as shown, the system 600 includes a first participant device 602, a server device 604, a data store device 606, a computing device 608, and a second participant device 610. The first participant device 602, the computing device 608, and the second participant device 610 are user devices configured to run a client application or otherwise connect to a video conference. In one non-limiting example, the first participant device 602 may be one of the client devices 304 through 310 shown in FIG. 3, the computing device 608 may be the physical space device 504 shown in FIG. 5, and the second participant device 610 may be one of the remote devices 1 516 through N 518 shown in FIG. 5. The server device 604 is a server configured to facilitate at least a portion of the conference video stream annotation process. For example, the server device 604 may be the application server 108 shown in FIG. 1. The data store device 606 is a server configured to host a participant media data store 612 within which various media uploaded for use with the conference video stream annotation process may be stored. For example, the data store device 606 may be the database server 110 shown in FIG. 1.

The system 600 performs at least two functions in connection with the annotation of a conference video stream with participant name information. First, the system 600 enables users who will be participants of a video conference to enroll in, and thus authorize the system 600 to perform, participant recognition against media obtained of the users and to use name labels, presented as annotations to a video stream depicting the participants, to present their determined names to other participants of a subject video conference. Second, the system 600, based on that enrollment and authorization input, performs participant recognition and labeling as described during a video conference to cause annotations representing name information of subject participants to be output for display at one or more participant devices connected to the video conference.

The enrollment and authorization process is described with respect to the first participant device 602, the server device 604, and the data store device 606. In particular, the enrollment and authorization process may occur at a time before a subject video conference begins or otherwise at or near a beginning of that video conference. The enrollment and authorization process involves a user of the first participant device 602 providing their consent to participate in this name recognition process by the system 600 as well as some media usable to identify them. In the examples shown and described throughout this disclosure, the media corresponds to one of images or audio; however, other suitable types of media may also or instead be used in connection with the implementations of this disclosure.

To further describe this enrollment and authorization process performed by the system 600, reference is made to FIGS. 7, 8, and 9A-B, which describe example operations performed and example user interfaces used in connection with an enrollment and authorization process performed using either images of conference participants or audio of conference participants.

Figure 7:
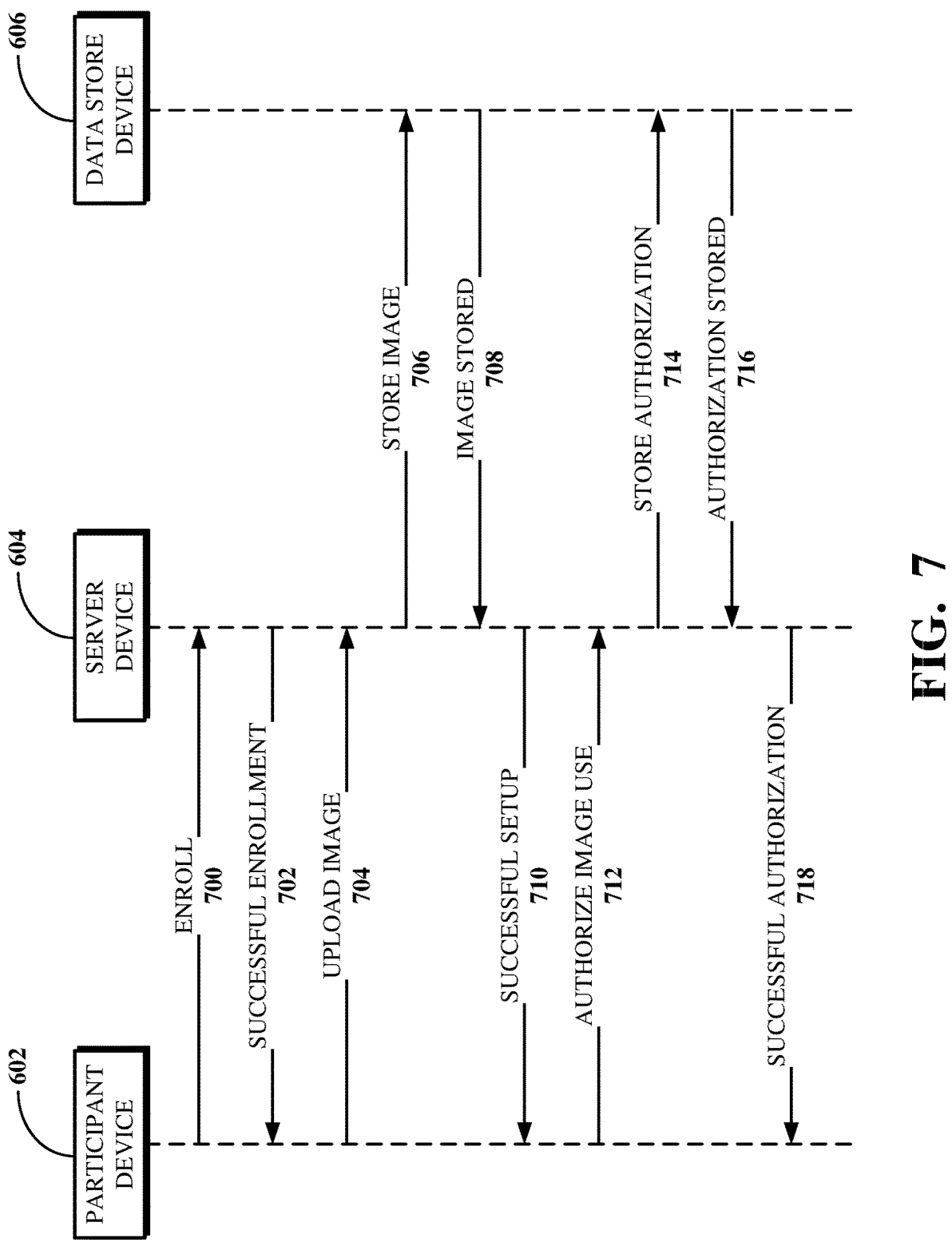
FIG. 7 is a swim lane diagram of an example of an enrollment process performed by a conference video stream annotation system that uses facial recognition.

FIG. 7 is a swim lane diagram of an example of an enrollment and authorization process performed by a conference video stream annotation system that uses facial recognition. In particular, the swim lane diagram of FIG. 7 describes how the system 600 can use images of conference participants in connection with the enrollment and authorization of those conference participants in a later recognition process. The swim lane diagram of FIG. 7 illustrates data communications, and thus operations performed, between the participant device 602 and the server device 604 as well as between the server device 604 and the data store device 606. In particular, the operations shown and described with respect to the swim lane diagram of FIG. 7 may be performed using media processing software 614 running at the server device 604.

The operations begin with a user of the participant device 602 accessing a user interface provided by the server device 604 to enroll 700 in a participant recognition and labeling process. For example, the enrollment 700 may include the user of the participant device 602 providing input in some form to explicitly indicate that they consent to participating in a participant recognition and labeling process to enable their name information to be labeled within a conference video stream, for one or more video conferences. For example, the enrollment may be specific to a certain video conference or it may be generic and apply to any video conference that the user may attend. The server device 604 processes the enrollment 700 to indicate a successful enrollment 702 of the user to the participant device 602. For example, the server device 604 may provide, as the successful enrollment 702, output acknowledging the enrollment 700 in some form.

In some implementations, the enrollment 700 and successful enrollment 702 may be performed between an administrator device (not shown) and the server device 604 instead of between the participant device 602 and the server device 604. For example, an administrator of a conferencing software service account (e.g., a customer of a software platform, such as a UCaaS platform) may provide the enrollment 700 input on behalf of one or more users of that account.

Following the successful enrollment 702, the user of the participant device 602 uploads 704 an image of the user to use in the later participant recognition and labeling process. The image may be derived from any of a variety of sources. For example, the image may be a profile photo of the user of the participant device 602 within a company directory or social media platform account. In another example, the image may be a new image captured at the participant device 602 in connection with the enrollment and authorization process. In yet another example, the image may be an image uploaded from a local device storage or cloud storage.

Regardless of the source, the image must depict the user of the participant device 602. In the event the image depicts persons other than the participant device 602, software at the server device 604 (e.g., the media processing software 614) may require that the user of the participant device 602 crop the image to cause those other persons to be removed from the image. The server device 604 processes the image (e.g., via the media processing software 614) to determine that the image depicts a face and meets one or more criteria. The one or more criteria correspond to image qualities that may detract from an accurate use of an uploaded image during participant recognition. For example, the one or more criteria may correspond to one or more of a minimum resolution, a percentage of a face that is depicted within the image (e.g., based on objects obscuring portions of the face and/or the image being other than of the front of the face), or locations of any objects obscuring the face. Thus, in one example, the one or more criteria may be met where the image depicts the front of the face without obstruction and is of a resolution that meets a threshold resolution. However, in another example, the one or more criteria may not be met where the image depicts a side of the face, includes objects obscuring one or more portions of the face (e.g., the eyes, nose, or mouth), and/or is of a resolution that is below a threshold resolution. The server device 604 (e.g., via the media processing software 614) may, for example, perform this image processing using a deep learning model or other machine learning model trained to perform image face detection.

In the event the server device 604 determines that the uploaded image does not depict a face and/or does not meet the one or more criteria, the server device 604 may transmit a request (not shown) to the participant device 602 for the user of the participant device 602 to upload a different image. However, based on a determination that the uploaded image depicts a face and meets the one or more criteria, the server device 604 causes the data store device 606 to store 706 the image within the participant media data store 612. The data store device 606 sends an indication 708 that the image has been successfully stored to the server device 604. The server device 604 then indicates the successful setup 710 of the image for later participant recognition use.

Optionally, the swim lane diagram provides a secondary consent mechanism to confirm the approval by the user to use the uploaded image for participant recognition following the successful setup 710 indication. Where this secondary consent mechanism is used, the participant device 602, based on the successful setup 710 indication, provides an authorization 712 for the system 600 to use the uploaded image to the server device 604. The server device 604 stores that authorization 712 and/or data associated therewith at the data store device 606 (e.g., within the participant media data store 612, for example, as metadata associated with the stored image uploaded from the participant device 602). The data store device 606 indicates the storage 716 of the authorization back to the server device 604, which then indicates the successful authorization 718 to the participant device 602.

Figure 8:
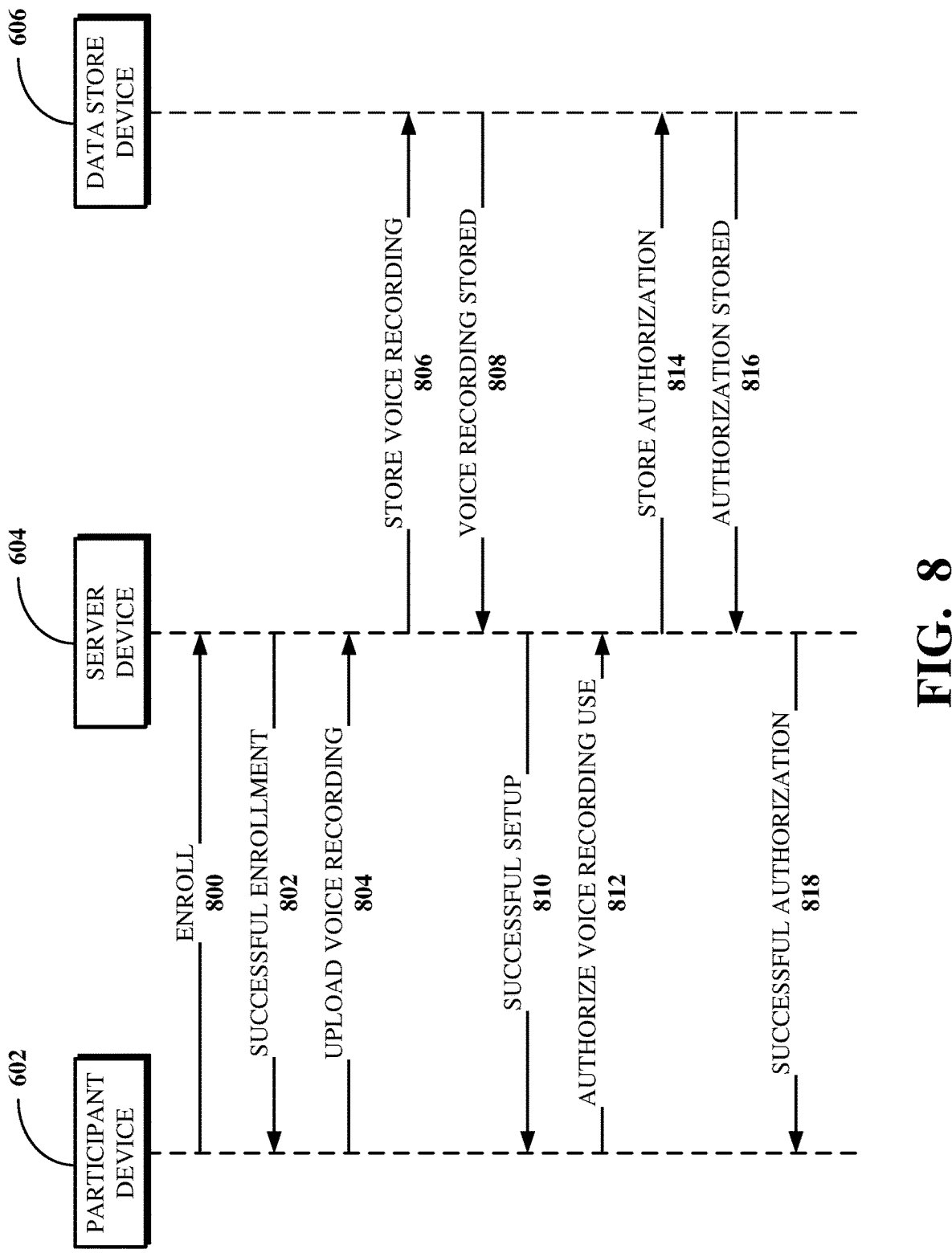
FIG. 8 is a swim lane diagram of an example of an enrollment process performed by a conference video stream annotation system that uses speech recognition.

FIG. 8 is a swim lane diagram of an example of an enrollment process performed by a conference video stream annotation system that uses speech recognition. In particular, the swim lane diagram of FIG. 8 describes an approach alternative to that of FIG. 7, showing that the system 600 can use voiceprints of conference participants in connection with the enrollment and authorization of those conference participants in a later recognition process. As with FIG. 7, the swim lane diagram of FIG. 8 illustrates data communications, and thus operations performed, between the participant device 602 and the server device 604 as well as between the server device 604 and the data store device 606. In particular, the operations shown and described with respect to the swim lane diagram of FIG. 8 may be performed using media processing software 614 running at the server device 604.

The operations begin with a user of the participant device 602 accessing a user interface provided by the server device 604 to enroll 800 in a participant recognition and labeling process. For example, the enrollment 800 may include the user of the participant device 602 providing input in some form to explicitly indicate that they consent to participating in a participant recognition and labeling process to enable their name information to be labeled within a conference video stream, for one or more video conferences. For example, the enrollment may be specific to a certain video conference or it may be generic and apply to any video conference that the user may attend. The server device 604 processes the enrollment 800 to indicate a successful enrollment 802 of the user to the participant device 602. For example, the server device 604 may provide, as the successful enrollment 802, output acknowledging the enrollment 800 in some form.

In some implementations, the enrollment 800 and successful enrollment 802 may be performed between an administrator device (not shown) and the server device 604 instead of between the participant device 602 and the server device 604. For example, an administrator of a conferencing software service account (e.g., a customer of a software platform, such as a UCaaS platform) may provide the enrollment 800 input on behalf of one or more users of that account.

Following the successful enrollment 802, the user of the participant device 602 uploads 804 a voiceprint of the user to use in the later participant recognition and labeling process. The voiceprint may be derived from any of a variety of sources. For example, the voiceprint may be an audio recording previously generated for use with a company with which the user of the participant device 602 is associated (e.g., in which the audio recording was generated for security or like purposes to identify the user of the participant device 602). In another example, the voiceprint may be a new audio recording captured at the participant device 602 in connection with the enrollment and authorization process. In yet another example, the voiceprint may be an audio recording uploaded from a local device storage or cloud storage.

Regardless of the source, the voiceprint must represent (i.e., audibly include) speech of the user of the participant device 602. The server device 604 processes the voiceprint (e.g., via the media processing software 614) to determine that the voiceprint represents speech of the user of the participant device 602 and meets one or more criteria. The one or more criteria correspond to audio qualities that may detract from an accurate use of an uploaded voiceprint during participant recognition. For example, the one or more criteria may correspond to one or more of a minimum noise level (e.g., measured in decibels), an amount of noise artifacts obscuring the speech of the user of the participant device 602, or a number of speakers detected within the voiceprint. Thus, in one example, the one or more criteria may be met where the voiceprint is of a noise level that meets a threshold noise level, includes a number of noise artifacts that meets a threshold number of noise artifacts, and includes speech only from one person. However, in another example, the one or more criteria may not be met where the voiceprint is of a noise level that is below the threshold noise level, includes a number of noise artifacts that exceeds a threshold number of noise artifacts, and includes speech from multiple people. The server device 604 (e.g., via the media processing software 614) may, for example, perform this audio processing using a deep learning model or other machine learning model trained to perform speech detection.

In the event the server device 604 determines that the uploaded voiceprint does not represent speech and/or does not meet the one or more criteria, the server device 604 may transmit a request (not shown) to the participant device 602 for the user of the participant device 602 to upload a different audio recording as the voiceprint. However, based on a determination that the uploaded voiceprint represents speech and meets the one or more criteria, the server device 604 causes the data store device 606 to store 806 the voiceprint within the participant media data store 612. The data store device 606 sends an indication 808 that the voiceprint has been successfully stored to the server device 604. The server device 604 then indicates the successful setup 810 of the voiceprint for later participant recognition use.

Optionally, the swim lane diagram provides a secondary consent mechanism to confirm the approval by the user to use the uploaded voiceprint for participant recognition following the successful setup 810 indication. Where this secondary consent mechanism is used, the participant device 602, based on the successful setup 810 indication, provides an authorization 812 for the system 600 to use the uploaded voiceprint to the server device 604. The server device 604 stores that authorization 812 and/or data associated therewith at the data store device 606 (e.g., within the participant media data store 612, for example, as metadata associated with the stored voiceprint uploaded from the participant device 602). The data store device 606 indicates the storage 816 of the authorization back to the server device 604, which then indicates the successful authorization 818 to the participant device 602.

In some implementations, the system 600 may enable the user of the participant device 602 to upload both an image and a voiceprint and thus may perform both of the operations shown and described with respect to FIG. 7 as well as the operations shown and described with respect to FIG. 8 for the user of the participant device 602. For example, an image and a voiceprint may both be uploaded for a user of the participant device 602 to enable secondary recognition mechanisms performable during the later participant recognition and labeling process. In this way, in the event there is a low recognition confidence using either the uploaded image or the uploaded voiceprint, the other may still be used as a back up to recognize the user of the participant device 602 and annotate a conference video stream using their name information.

FIGS. 9A-B are illustrations of examples of enrollment and authorization forms used to obtain participant consent for participant recognition during video conferences. For example the enrollment and authorization forms shown in FIGS. 9A-B may be displayed within a GUI output at the participant device 602 during an enrollment and authorization process performed using the system 600.

Referring first to FIG. 9A, a form for name labeling enrollment and authorization is shown as allowing a user of the participant device 602 to provide their consent to having their media, in this case an image, used for later participant recognition during one or more video conferences. In particular, a checkbox is checked to denote the explicit consent of the user of the participant device 602. The form also includes one or more user interface elements which may be interacted with to cause the upload of an image for the user of the participant device 602. For example, as shown, the form includes elements to use a profile photo, take a photo, or upload another photo. Interacting with any of these elements will cause an image to be uploaded and processed in the manner described with respect to FIG. 7.

Referring next to FIG. 9B, a form for name labeling enrollment and authorization is shown as allowing a user of the participant device 602 to provide their consent to having their media, in this case a voiceprint, used for later participant recognition during one or more video conferences. In particular, a checkbox is checked to denote the explicit consent of the user of the participant device 602. The form also includes one or more user interface elements which may be interacted with to cause the upload of a voiceprint for the user of the participant device 602. For example, as shown, the form includes elements to use a voiceprint, record a voiceprint, or upload another voiceprint. Interacting with any of these elements will cause a voiceprint to be uploaded and processed in the manner described with respect to FIG. 8.

The enrollment and authorization process is shown and described with respect to FIGS. 6-8 and 9A-B as being performed at or otherwise in connection with the server device 604. However, in some implementations, some or all of the enrollment and authorization process may be performed at or otherwise in connection with a device other than the server device 604. For example, the enrollment and authorization may be specific to a certain physical space and thus be performed at or otherwise in connection with a physical space computing device, such as the computing device 602.

Referring back to FIG. 6, the participant recognition and labeling process is described with respect to the data store device 606, the computing device 608, and the second participant device 610. In particular, the participant recognition and labeling process may occur during a subject video conference and in any event after the above enrollment and authorization process for involved participants has been completed. The participant recognition and labeling process involves performing participant recognition by comparing n the media stored in connection with the above enrollment and authorization process for a participant against media captured during the video conference and thereafter using name information for the participant, determined based on the participant recognition process, to generate an annotation to display with a conference video stream depicting the participant. In the examples shown and described throughout this disclosure, the media corresponds to one of images or audio; however, as with the enrollment and authorization process described above, other suitable types of media may also or instead be used in connection with the implementations of this disclosure.

To further describe this participant recognition and labeling process performed by the system 600, reference is made to FIGS. 10-12 and 13A-B, which describe example operations performed and example user interfaces used in connection with a participant recognition and labeling process performed using either images of conference participants or audio of conference participants.

Figure 10:
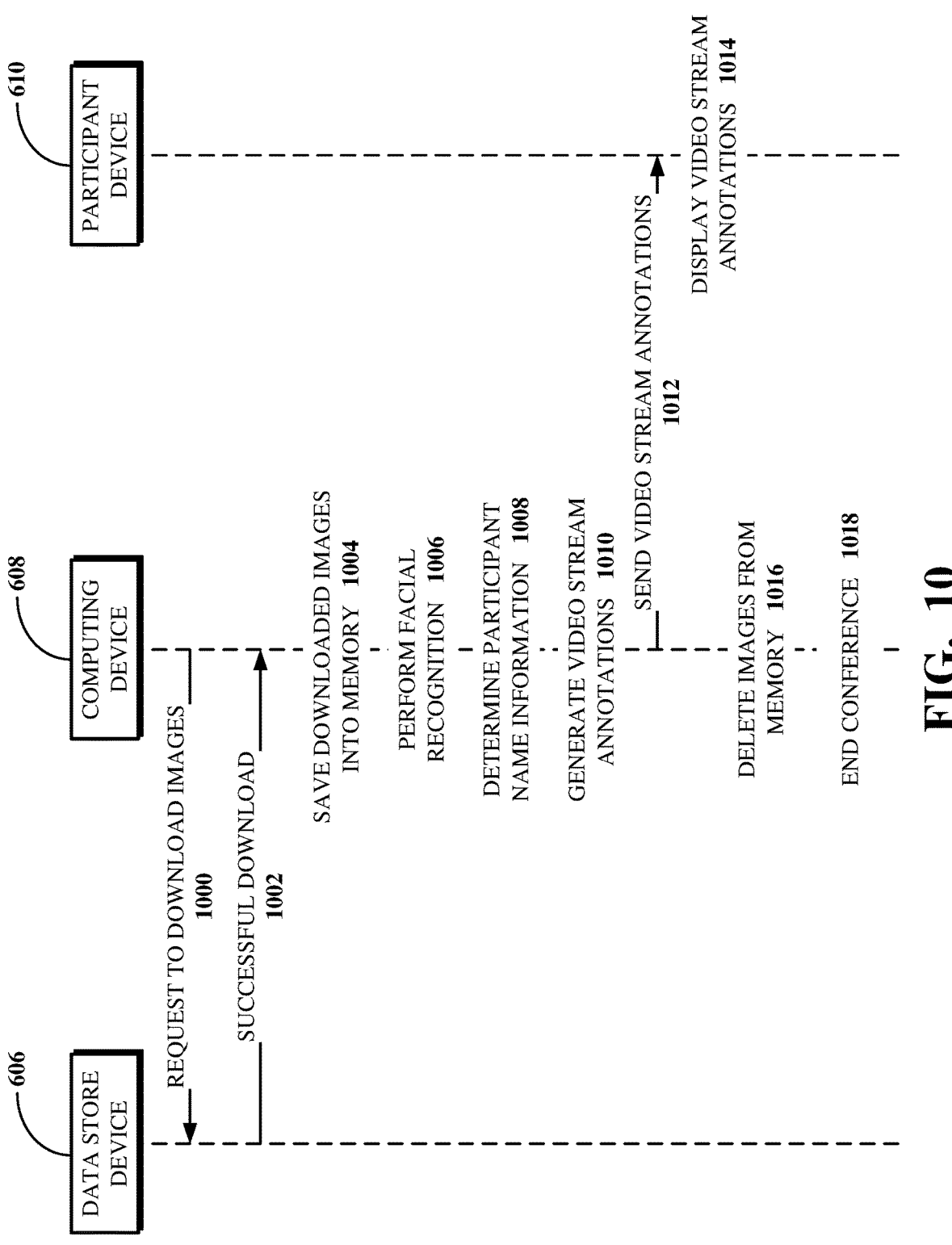
FIG. 10 is a swim lane diagram of an example of a recognition process performed by a conference video stream annotation system that uses facial recognition.

FIG. 10 is a swim lane diagram of an example of a recognition process performed by a conference video stream annotation system that uses facial recognition. In particular, the swim lane diagram of FIG. 10 describes how the system 600 can use images of conference participants previously stored in connection with the enrollment and authorization of those conference participants, as described above with respect to FIGS. 6-8 and 9-A-B, and images of conference participants captured during a video conference to perform facial recognition and generate conference video stream annotations. The swim lane diagram of FIG. 10 illustrates data communications, and thus operations performed, between the data store device 606, the computing device 608, and the second participant device 610. In particular, the operations shown and described with respect to the swim lane diagram of FIG. 10 may be performed using participant recognition software 616 and annotation generation software 618 running at the computing device 608.

The operations begin with the computing device 608 requesting 1000 to download images of conference participants from the data store device 606 (i.e., via a request to retrieve or otherwise obtain those images from the participant media data store 612). The computing device 608 limits the request to images of certain conference participants based on one or more factors. For example, the computing device 608 may request to download the images of only those conference participants whose personal computing devices have paired to the computing device 608. A personal computing device is a computing device configured for personal use (e.g., a smartphone, tablet computer, or laptop computer) and may, for example, be a client device that runs a client application associated with a software platform used to facilitate the video conference (e.g., the software platform 300 shown in FIG. 3). A personal computing device can pair to the computing device 608 in one or more ways, including, without limitation, ultrasonic pairing short range wireless pairing protocols such as Bluetooth. The pairing of a personal computing device to the computing device 608 may be automatic, for example, upon the personal computing device moving within a pairing range of the computing device 608, or it can be manual, for example, by a user of the personal computing device initiating or otherwise confirming to pair with the computing device 608 via one or more actions manually performed by the user at the personal computing device. A participant can be identified based on a paired personal computing device by the computing device 608 identifying a unique identifier for the personal computing device (e.g., an IP or MAC address) and comparing that unique identifier against a record of device identifiers stored locally at the computing device 608 or in a cloud storage (e.g., a data store accessible by the computing device 608), in which the record for a given device identifies a known user thereof. In another example, the computing device 608 may request to download images for only those conference participants who are both listed on a participant invite list for the video conference and whose personal computing devices are paired to the computing device 608. The participant invite list may, for example, be accessible to all participants invited to attend the video conference, to a host who scheduled the video conference, or to an administrator of an account used for the video conference.

Based on the request 1000 to download the images, the data store device 606 indicates 1002 a successful download of those images to the computing device 608. For example, the indication 1002 may be an indication that a last one of the images has downloaded, an indication that all of the images have downloaded, or simply the downloaded images themselves. The computing device 608 saves 1004 the downloaded images into a local memory of the computing device 608.

The computing device 608 then performs 1006 facial recognition against the stored images that have been downloaded by and saved into the local memory at the computing device 608 as well as against video conference images captured within a video stream of the physical space within which the participants to be recognized are located. To perform 1006 the facial recognition for a given conference participant, the computing device 608 uses a deep learning model trained for facial recognition to extract a first set of high dimensional features from a stored image saved to the local memory of the computing device 608 and depicting the conference participant and to extract a second set of high dimensional features from an image depicting the conference participant from the conference video stream. The first and second sets of the high dimensional features are then compared to determine whether they match (e.g., are identical or within a threshold degree of error). Based on a determination that the first and second sets of the high dimensional features match, the conference participant depicted in the image from the conference video stream is determined to be the same conference participant depicted in the stored image saved to the local memory of the computing device 608. The extraction and comparison of the high dimensional features is discussed in further detail with respect to FIG. 12.

The output of the facial recognition is an indication of conference participants whose images match. For each such matching participant, the computing device 608 next determines 1008 their name information. For example, determining the name information of a participant can include prompting a user of the computing device 608 or a personal computing device of the participant to input the name of the participant. In another example, determining the name information of a participant can include obtaining name information stored within a record associated with the participant (e.g., as the user of the paired personal computing device described above) from a data store. In some such cases, the determined name information obtained from the data store record can be presented for user verification, for example, at the computing device 608 or a personal computing device of the participant.

For any participants who are detected within one or more images of a conference video stream but for whom stored images are not downloaded and saved to the local memory of the computing device 608 (e.g., because those stored images do not exist), the computing device 608 can either prompt those participants to complete the enrollment and authorization process described above during the video conference to provide an image, which can then be processed and stored to prepare same for facial recognition processing, or the computing device 608 can simply indicate that no match was determined for those participants with any of the stored images saved to the local memory of the computing device 608. In either such case, those participants may be prompted (e.g., at the computing device 608 or otherwise) to provide their name information.

The computing device 608 then generates 1010 video stream annotations representing the name information determined for the various conference participants. An annotation includes text with the name information for a subject conference participant and will be included within the conference video stream depicting the conference participant at a location proximate to the depiction of the conference participant therein. However, the annotation may have any of a variety of formats, colors, fonts, and/or the like. Typically, the annotations for all conference participants will have identical looks and feels and will only differ in the specific name information text presented therein. Generating a video stream annotation includes determining location information at which to cause the annotation to be displayed within the conference video stream. Determining the location information for an annotation includes determining a location of a depiction of the conference participant within the conference video stream. For example, coordinate information for each conference participant can be recorded as part of the facial recognition processing, such as based on a match determined via that facial recognition, in which the coordinate information represents a given image of the conference video stream in a two-dimensional format with X and Y axes.

Generating the video stream annotations can also include including the video stream annotations within the conference video stream. For example, the computing device 608, via the annotation generation software 618, can use the location information determined for a given conference participant to include an annotation with their name label within images of the conference video stream as those images are captured in real-time or substantially in real-time using a camera configured for use with the computing device 608. The conference video stream modification by the annotation inclusion may, for example, be performed within a client application used to connect the computing device 608 to the video conference. Alternatively, generating the video stream annotations can instead include maintaining the video stream annotations separate from the conference video stream, in which case a participant device later receiving both (e.g., the participant device 610) will combine them by including the video stream annotations at the relevant locations using the conference video stream, the annotations, and the location information as all are transmitted to the participant device.

Thus, the computing device 608 sends 1012 the video stream annotations to the participant device 610 to cause the participant device 610 to display 1014 the video stream annotations along with the conference video stream. For example, where the computing device 608 includes the annotations within the video stream, the computing device 608 can send 1012 the video stream including the annotations to the participant device 610, in which case the participant device 610 can simply process and render the conference video stream as any other typical video stream obtained during a video conference. However, where the computing device 608 sends the conference video stream, the annotations, and the location information to the participant device 610, the participant device 610 can process the sent data by, at the participant device 610, including the annotations within the conference video stream and the relevant locations specified by the location information prior to rendering the conference video stream for display at the participant device 610.

Information associated with the facial recognition and annotation generation processes may be stored in the local memory of the computing device 608 for further use during the video conference. In particular, that stored information may be used to track movements of a conference participant for whom an annotation is already generated and displayed within the conference video stream. Tracking the movements of such a conference participant can include determining new location information for the annotation associated with that conference participant based on the conference participant moving from an original location at which they are depicted within the conference video stream. In some cases, where the face of such a conference participant is no longer visible to the camera used to capture the conference video stream, the stored information may still be used to track the conference participant based on other portions of their body remaining visible within the conference video stream.

In some cases, a conference participant for whom such information is stored may at some point during the video conference leave a field of view of the camera used to capture the conference video stream (e.g., determined based on the participant tracking described above). In such a case, the annotation will also be removed from the conference video stream or, as the case may be, data indicative of the annotation and corresponding location information thereof may no longer be sent to the participant device 610. In the event the conference participant again becomes detected within the conference video stream (e.g., based on a comparison of new high dimensional features determined using then-current images from the conference video stream against the first or second set of high dimensional features previously determined for the conference participant), the stored information may be used to reproduce the annotation for the conference participant and cause same to be displayed at the participant device 610 again.

When it is time for the video conference to end (e.g., determined based on a user of the computing device 608 or a host of the video conference, if different, interacting with a video conference GUI to cause the end of the video conference), the computing device 608 deletes 1016 the saved images from the local memory. Where other information is stored in the local memory for use during the video conference (e.g., for conference participant tracking), that other information is also deleted from the local memory as part of the same process. The video conference then ends 1018 once the stored images and any stored information are deleted.

In some implementations, before sending 1000 the request to download the images, the operations may include verifying that participant recognition is authorized for the computing device 608 during the video conference. For example, an administrator can enable the participant recognition and labeling process for a given physical space sometime before a subject video conference begins. When the video conference later begins, a determination can be made as to whether participant recognition and labeling is enabled for the physical space (e.g., by the physical space computing device, such as the computing device 608). The ensuing participant recognition and labeling process can thus be performed where same has been enabled.

In some implementations, the stored images and other information may be saved to a cache other than in a local memory of the computing device 608. For example, a separate processing cache or a cache that is not local to the computing device 608 may instead be used.

Figure 11:
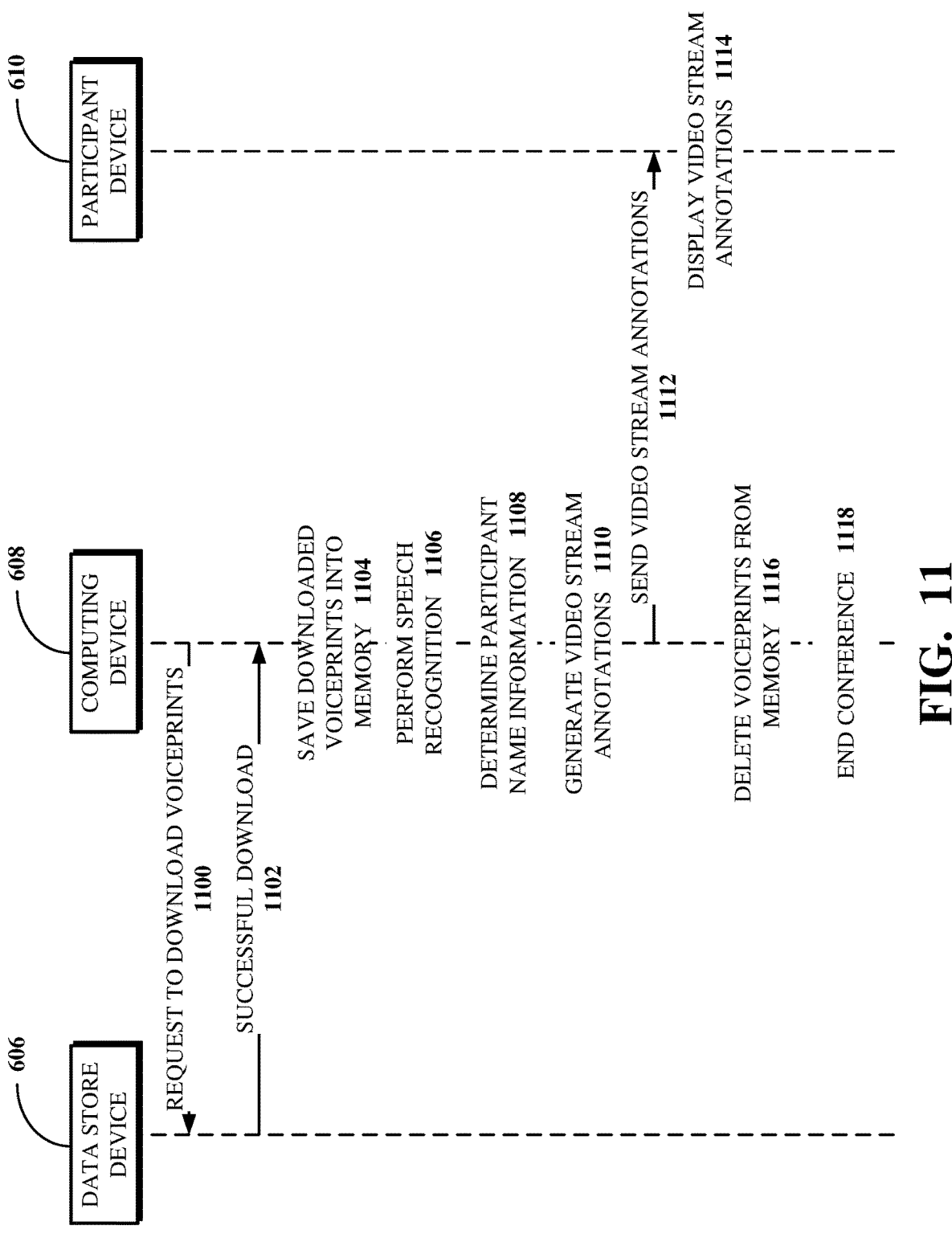
FIG. 11 is a swim lane diagram of an example of a recognition process performed by a conference video stream annotation system that uses speech recognition.

FIG. 11 is a swim lane diagram of an example of a recognition process performed by a conference video stream annotation system that uses speech recognition. In particular, the swim lane diagram of FIG. 11 describes how the system 600 can use voiceprints of conference participants previously stored in connection with the enrollment and authorization of those conference participants, as described above with respect to FIGS. 6-8 and 9-A-B, and audio segments of conference participants captured during a video conference to perform speech recognition and generate conference video stream annotations. The swim lane diagram of FIG. 11 illustrates data communications, and thus operations performed, between the data store device 606, the computing device 608, and the second participant device 610. In particular, the operations shown and described with respect to the swim lane diagram of FIG. 11 may be performed using the participant recognition software 616 and the annotation generation software 618 running at the computing device 608.

The operations begin with the computing device 608 requesting 1100 to download voiceprints of conference participants from the data store device 606 (i.e., via a request to retrieve or otherwise obtain those voiceprints from the participant media data store 612). The computing device 608 limits the request to voiceprints of certain conference participants based on one or more factors. For example, the computing device 608 may request to download the voiceprints of only those conference participants whose personal computing devices have paired to the computing device 608. As described above, a personal computing device is a computing device configured for personal use (e.g., a smartphone, tablet computer, or laptop computer) and may, for example, be a client device that runs a client application associated with a software platform used to facilitate the video conference (e.g., the software platform 300 shown in FIG. 3). A personal computing device can pair to the computing device 608 in one or more ways, including, without limitation, ultrasonic pairing short range wireless pairing protocols such as Bluetooth. The pairing of a personal computing device to the computing device 608 may be automatic, for example, upon the personal computing device moving within a pairing range of the computing device 608, or it can be manual, for example, by a user of the personal computing device initiating or otherwise confirming to pair with the computing device 608 via one or more actions manually performed by the user at the personal computing device. A participant can be identified based on a paired personal computing device by the computing device 608 identifying a unique identifier for the personal computing device (e.g., an IP or MAC address) and comparing that unique identifier against a record of device identifiers stored locally at the computing device 608 or in a cloud storage (e.g., a data store accessible by the computing device 608), in which the record for a given device identifies a known user thereof. In another example, the computing device 608 may request to download voiceprints for only those conference participants who are both listed on a participant invite list for the video conference and whose personal computing devices are paired to the computing device 608. The participant invite list may, for example, be accessible to all participants invited to attend the video conference, to a host who scheduled the video conference, or to an administrator of an account used for the video conference.

Based on the request 1100 to download the voiceprints, the data store device 606 indicates 1102 a successful download of those voiceprints to the computing device 608. For example, the indication 1102 may be an indication that a last one of the voiceprints has downloaded, an indication that all of the voiceprints have downloaded, or simply the downloaded voiceprints themselves. The computing device 608 saves 1104 the downloaded voiceprints into a local memory of the computing device 608.

The computing device 608 then performs 1106 speech recognition against the stored voiceprints that have been downloaded by and saved into the local memory at the computing device 608 as well as against video conference audio segments captured using a microphone of the physical space within which the participants to be recognized are located. To perform 1106 the speech recognition for a given conference participant, the computing device 608 uses a deep learning model trained for speech recognition to extract a first set of high dimensional features from a stored voiceprint saved to the local memory of the computing device 608 and representing the conference participant and to extract a second set of high dimensional features from an audio segment representing speech of the conference participant from the conference video stream. The first and second sets of the high dimensional features are then compared to determine whether they match (e.g., are identical or within a threshold degree of error). Based on a determination that the first and second sets of the high dimensional features match, the conference participant represented in the audio segment from the video conference is determined to be the same conference participant represented in the stored voiceprint saved to the local memory of the computing device 608. The extraction and comparison of the high dimensional features is discussed in further detail with respect to FIG. 12.

The output of the speech recognition is an indication of conference participants whose voiceprints match. For each such matching participant, the computing device 608 next determines 1108 their name information. For example, determining the name information of a participant can include prompting a user of the computing device 608 or a personal computing device of the participant to input the name of the participant. In another example, determining the name information of a participant can include obtaining name information stored within a record associated with the participant (e.g., as the user of the paired personal computing device described above) from a data store. In some such cases, the determined name information obtained from the data store record can be presented for user verification, for example, at the computing device 608 or a personal computing device of the participant.

For any participants who are detected within one or more audio segments but for whom stored voiceprints are not downloaded and saved to the local memory of the computing device 608 (e.g., because those stored voiceprints do not exist), the computing device 608 can either prompt those participants to complete the enrollment and authorization process described above during the video conference to provide a voiceprint, which can then be processed and stored to prepare same for speech recognition processing, or the computing device 608 can simply indicate that no match was determined for those participants with any of the stored voiceprints saved to the local memory of the computing device 608. In either such case, those participants may be prompted (e.g., at the computing device 608 or otherwise) to provide their name information.

The computing device 608 then generates 1110 video stream annotations representing the name information determined for the various conference participants. An annotation includes text with the name information for a subject conference participant and will be included within the conference video stream depicting the conference participant at a location proximate to the depiction of the conference participant therein. However, the annotation may have any of a variety of formats, colors, fonts, and/or the like. Typically, the annotations for all conference participants will have identical looks and feels and will only differ in the specific name information text presented therein. Generating a video stream annotation includes determining location information at which to cause the annotation to be displayed within the conference video stream. Determining the location information for an annotation includes determining a location of a depiction of the conference participant within the conference video stream. For example, coordinate information for each conference participant can be recorded as part of a facial recognition process (e.g., described above with respect to FIG. 10), such as based on a match determined via that facial recognition, in which the coordinate information represents a given image of the conference video stream in a two-dimensional format with X and Y axes. Where there is no available conference video stream for the computing device 608, location information for an annotation may be assigned randomly, according to an arrangement determined for the conference participants connecting from the computing device 608, or otherwise so as to cause the annotations to appear over images other than corresponding to a conference video stream depicting conference participants in a physical space.

Where a conference video stream is available for the computing device 608, generating the video stream annotations can also include including the video stream annotations within the conference video stream. For example, the computing device 608, via the annotation generation software 618, can use the location information determined for a given conference participant to include an annotation with their name label within images of the conference video stream as those images are captured in real-time or substantially in real-time using a camera configured for use with the computing device 608. The conference video stream modification by the annotation inclusion may, for example, be performed within a client application used to connect the computing device 608 to the video conference. Alternatively, generating the video stream annotations can instead include maintaining the video stream annotations separate from the conference video stream, in which case a participant device later receiving both (e.g., the participant device 610) will combine them by including the video stream annotations at the relevant locations using the conference video stream, the annotations, and the location information as all are transmitted to the participant device.

Thus, the computing device 608 sends 1112 the video stream annotations to the participant device 610 to cause the participant device 610 to display 1114 the video stream annotations along with the conference video stream. For example, where the computing device 608 includes the annotations within the video stream, the computing device 608 can send 1112 the video stream including the annotations to the participant device 610, in which case the participant device 610 can simply process and render the conference video stream as any other typical video stream obtained during a video conference. However, where the computing device 608 sends the conference video stream, the annotations, and the location information to the participant device 610, the participant device 610 can process the sent data by, at the participant device 610, including the annotations within the conference video stream and the relevant locations specified by the location information prior to rendering the conference video stream for display at the participant device 610.

In some cases, an annotation may only be provided for display at the participant device 610 (e.g., and thus only sent from the computing device 608, as applicable) to denote the subject conference participant as an active speaker during the video conference. In such a case, the one or more annotations which are output for display at a given time will correspond only to the then-active speakers of the video conference, in which case the sets of annotations which are output for display throughout the video conference may differ.

When it is time for the video conference to end (e.g., determined based on a user of the computing device 608 or a host of the video conference, if different, interacting with a video conference GUI to cause the end of the video conference), the computing device 608 deletes 1116 the saved voiceprints from the local memory. The video conference then ends 1118 once the stored voiceprints are deleted.

In some implementations, before sending 1100 the request to download the voiceprints, the operations may include verifying that participant recognition is authorized for the computing device 608 during the video conference. For example, an administrator can enable the participant recognition and labeling process for a given physical space sometime before a subject video conference begins. When the video conference later begins, a determination can be made as to whether participant recognition and labeling is enabled for the physical space (e.g., by the physical space computing device, such as the computing device 608). The ensuing participant recognition and labeling process can thus be performed where same has been enabled.

In some implementations, the stored voiceprints may be saved to a cache other than in a local memory of the computing device 608. For example, a separate processing cache or a cache that is not local to the computing device 608 may instead be used.

Figure 12:
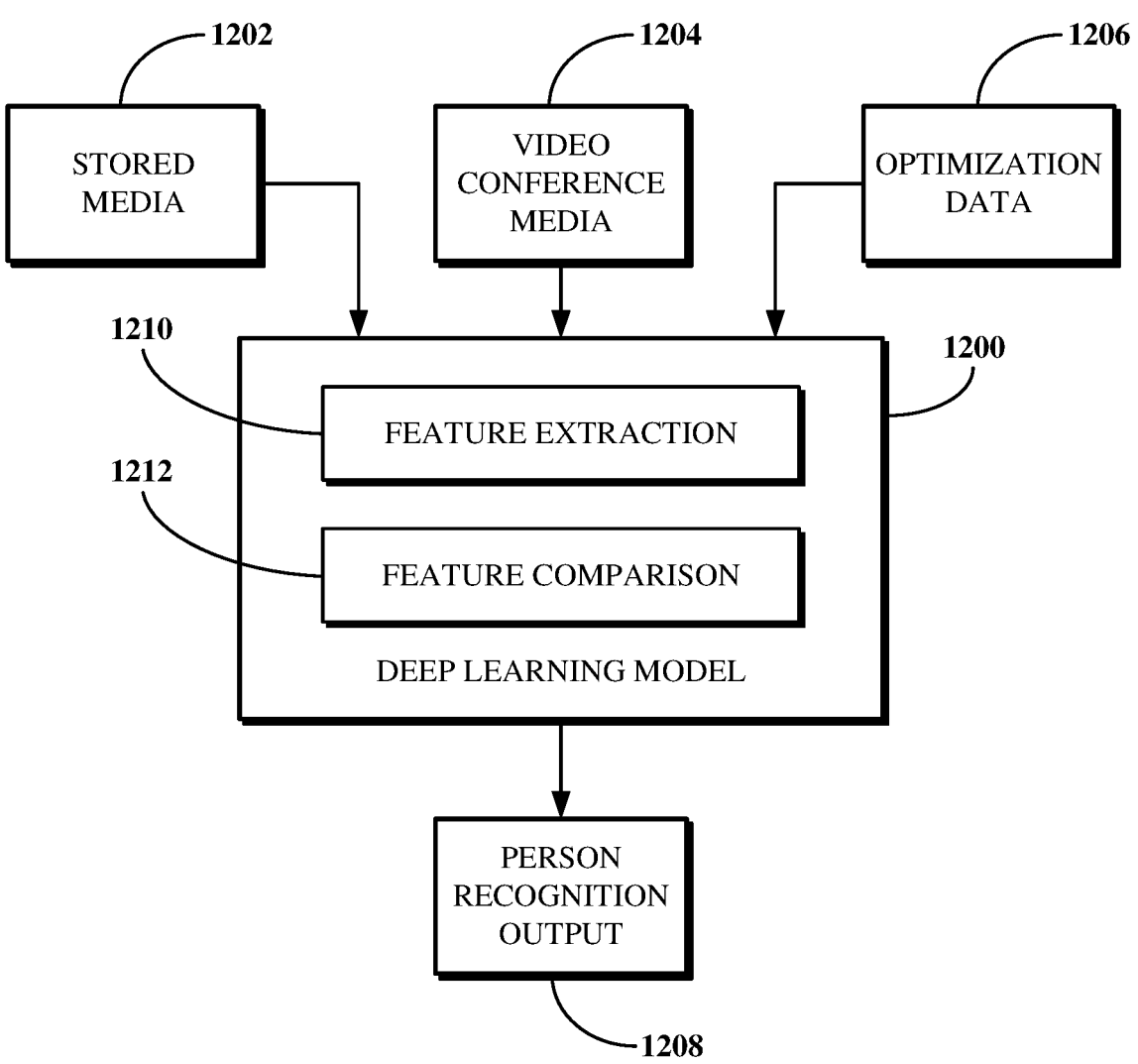
FIG. 12 is a block diagram of an example of deep learning functionality of a conference video stream annotation system.

To further describe details of the participant recognition and labeling process performed in connection with the swim lane diagrams of FIGS. 10-11, reference is made to FIG. 12, which is a block diagram of an example of deep learning functionality of the conference video stream annotation system 600, in particular, deep learning functionality used for to perform participant recognition using media associated with conference participants. The deep learning functionality of FIG. 12 is shown and described with respect to a deep learning model 1200, which is a machine learning model trained to perform participant recognition using input media, for example, images and/or audio. Thus, the system 600 may use the deep learning model 1200 as or otherwise in connection with the participant recognition software 616 shown in FIG. 6.

In one non-limiting example, the deep learning model 1200 may be a convolutional neural network trained across a commercially available dataset using supervised learning. The commercially available dataset includes media not uploaded to, captured for, otherwise associated with users of the system 600; rather, the commercially available dataset instead includes media associated with people who are not users of the system 600 and is provided for use in training the deep learning model 1200 with appropriate authorization from interested parties. Training the deep learning model 1200 using the commercially available dataset may, for example, include performing feature extraction across the media of the commercially available training dataset to teach the deep learning model 1200 to recognize face and/or speech details, thereby enabling the deep learning model 1200 to learn how to recognize patterns in how similar details can be extracted and connected during a video conference.

The deep learning model 1200 performs inferencing operations for participant recognition using two sets of input media, including stored media 1202 and video conference media 1204. The stored media 1202 includes media previously stored at the data store device 606 as part of the enrollment and authorization process described above with respect to FIGS. 6-8. The stored media 1202 may, for example, include one or more images obtained (e.g., downloaded) from the data store device 606 and/or one or more voiceprints obtained (e.g., downloaded) from the data store device 606, in which each image or voiceprint corresponds to one participant of the subject video conference.

The video conference media 1204 may, for example, include one or more images (e.g., video frames) of a video stream captured during a video conference and/or one or more audio segments of an audio stream captured during the video conference, in which each image may depict or each audio segment may represent one or more participants of the video conference. The one or more images may, for example, be captured using one or more cameras within a physical space (e.g., the physical space 502 shown in FIG. 5) and each depict one or more conference participants located within the physical space during the video conference. In one non-limiting example, the one or more images may include multiple images each cropped from an original, high resolution image extracted as a video frame from the conference video stream, in which each of the multiple cropped images corresponds to a region of interest of that original image depicting a single conference participant. The one or more audio segments may, for example, be captured using one or more microphones within the physical space and each represent speech of one or more conference participants located within the physical space during the video conference.

The deep learning model 1200 also uses optimization data 1206 to perform inferencing operations for participant recognition. The optimization data 1206 includes instructions (e.g., assembly language programming instructions) that leverage an inference framework to enable optimized processing of the stored media 1202 and the video conference media 1204. The optimization data 1206 may, for example, correspond to the Open VINO framework, the Core ML framework, or another framework according to the specific operating system and/or other characteristics or constraints of the computer running the deep learning model 1200.

The deep learning model 1200 produces participant recognition output 1208 based on high dimensional features corresponding to the participants represented by the stored media 1202 and the video conference media 1204. To produce the participant recognition output 1208, the deep learning model 1200 performs feature extraction 1210 and feature comparison 1212. Performing the feature extraction 1210 includes the deep learning model 1200 extracting (e.g., calculating or otherwise determining) a number of points within each image or audio recording of the stored media 1202 and within each image or audio segment of the video conference media 1204. In images, the points correspond to different locations about a face of a conference participant. For example, the points may be expressed in a two-dimensional or three-dimensional format. In audio, the points correspond to different locations about a soundwave representing speech of a conference participant. For example, the points may be expressed with respect to one or more of an amplitude, wavelength, or frequency of a soundwave.

Performing the feature comparison 1212 includes the deep learning model 1200 comparing ones of the points extracted from the stored media 1202 and the video conference media 1204 to determine distances between those ones of the points. In particular, performing the feature comparison 1212 for a given conference participant includes determining distances between pairs or other sets of points extracted from the stored media 1202, determining distances between corresponding pairs of other sets of points extracted from the video conference media 1204, and comparing the distances determined for the stored media 1202 and for the video conference media 1204. Where the comparison indicates that the distances determined for the stored media 1202 and for the video conference media 1204 are identical or otherwise within an acceptable degree of error, the points extracted from the stored media 1202 and from the video conference media 1204 are determined to correspond to the same person. In this case, the participant recognition output 1208 indicates that the person represented by the video conference media 1204 is the same person as is represented by the stored media 1202. Where the comparison indicates that the distances determined for the stored media 1202 and for the video conference media 1204 are not identical and not within an acceptable degree of error, the points extracted from the stored media 1202 and from the video conference media 1204 are determined to not correspond to the same person. In this case, the participant recognition output 1208 indicates that the person represented by the video conference media 1204 is different from the person represented by the stored media 1202.

Figure 13A:
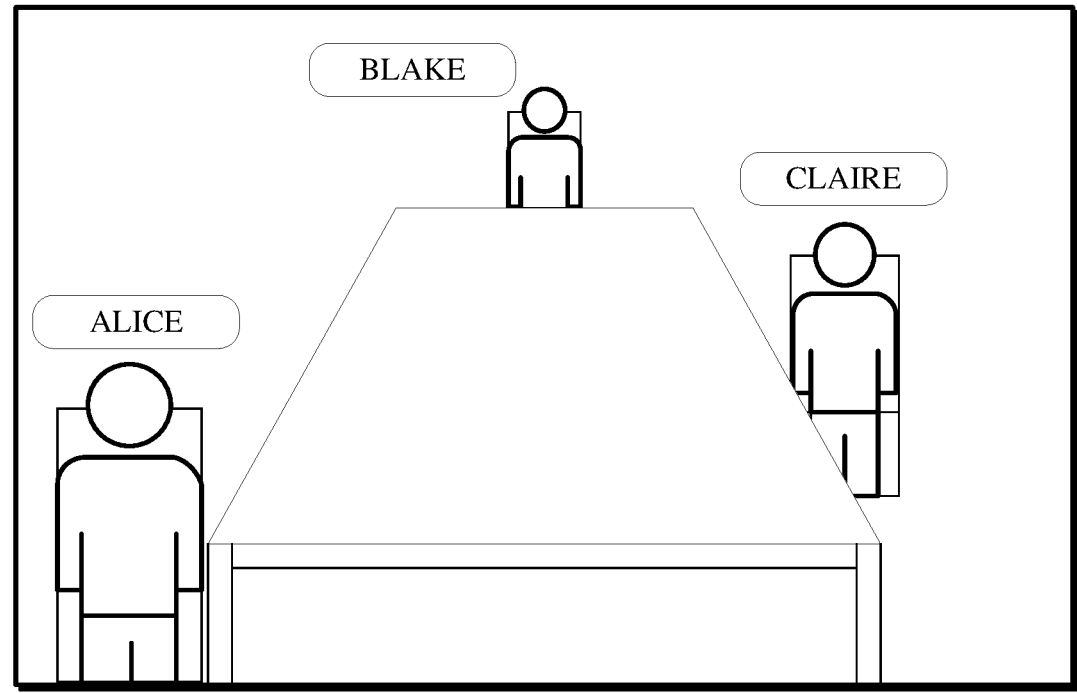
FIGS. 13A-B are illustrations of examples of a conference video stream annotated with participant names.
Figure 13B:
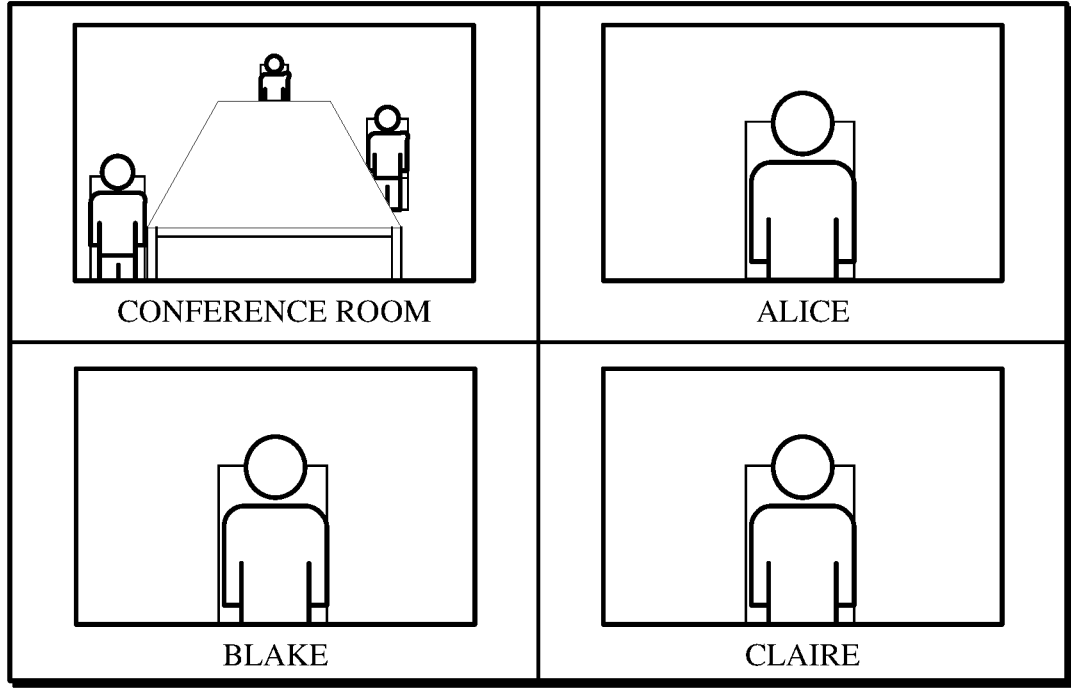

FIGS. 13A-B are illustrations of examples of a conference video stream annotated with participant names. Referring first to FIG. 13A, a conference video stream depicting three conference participants around a table in a physical space is shown. The conference participants are facing the camera used to capture the conference video stream. The conference participants are identified by facial and/or speech recognition to determine their name information, and that name information is then used to generate annotations comprising name labels based on that name information. In the example shown, the annotations appear proximate to the depictions of the conference participants and indicate the names of the respective conference participants-Alice, Blake, and Claire. While the annotations for Alice and Claire appear centered over their respective heads within the conference video stream, the annotation for Blake appears slightly to the left of center above their head because the conference video stream does not include enough space between the top of Blake's head and the top border of the conference video stream to fit the annotation for Blake. The conference video stream including the annotations for Alice, Blake, and Claire is rendered within a user interface tile of a video conference GUI using a conventional speaker view-type format.

Referring next to FIG. 13B, the same conference video stream from FIG. 13A is shown alongside other conference video streams each representing an individual region of interest from the conference video stream from FIG. 13A. Each of the regions of interest corresponds to one of the conference participants depicted within that conference video stream. Rather than having the annotations be included within the actual video of the conference video streams, the four video streams are rendered within four separate user interface tiles using a conventional gallery view-type format in which each of those separate user interface tiles is labeled according to the conference participants depicted therein. In the example shown, a user interface tile showing the region of interest corresponding to Alice is labeled with the annotation "Alice," a user interface tile showing the region of interest corresponding to Blake is labeled with the annotation "Blake," a user interface tile showing the region of interest corresponding to Claire is labeled with the annotation "Claire," and a user interface tile showing the entire physical space is labeled with the standard name for the physical space (i.e., the username represented by the video conferencing account used at the computing device within the physical space) "Conference Room."

The participant recognition and labeling process is shown and described with respect to FIGS. 6, 10-12, and 13A-B as being performed at or otherwise in connection with the computing device 608. However, in some implementations, some or all of the participant recognition and labeling process may be performed at or otherwise in connection with a device other than the computing device 608. For example, some or all of the participant recognition and labeling process may instead be performed at a server device used in connection with the video conference, for example, the server device 604 or another server device. For example, the server device 604 may use the deep learning model 1200 to perform the feature extraction 1210 and the feature comparison 1212. In some such cases, the computing device 608 obtains the output of the facial and/or speech recognition processes from the server device 604 and then locally performs the annotation generation. Such a server-side approach may be particularly advantageous where the number of conference participants depicted within a conference video stream is above a threshold, for example, to prevent the computing device 602 from expending substantial resources on performing the feature extraction 1210 and the feature comparison 1212 for large numbers of conference participants. In another example, the server device 604 may, for each conference video stream for which the participant recognition and labeling process is performed, obtain the conference video stream, annotations generated for conference participants depicted within the conference video stream, and location information for the annotations and produce an updated conference video stream based thereon. The server device 604 may then transmit the updated conference video stream for rendering at devices connected to the video conference. In yet another example, the server device 604 can perform the entirety of the participant recognition and labeling process.

While the participant recognition and labeling process is shown and described above as causing video stream annotations to be displayed at a single participant device, the video stream annotations may instead be displayed at multiple participant devices connected to the video conference, including the computing device 608 itself as well as any other participant devices. Alternatively, the video stream annotations may be displayed at all participant devices other than the device associated with the conference video stream within which the video stream annotations are included (e.g., at all remote participant devices but not at a physical space computing device). Furthermore, while the participant recognition and labeling process is shown and described with respect to a single conference video stream, in some implementations, the participant recognition and labeling process may instead be performed for some or all conference video streams from some or all devices connected to the video conference. For example, the video streams rendered within each user interface tile of the video conference GUI may include one or more annotations such that some or all conference participants, regardless of the device they are using to connect to the video conference, are simultaneously or near simultaneously represented by such annotations.

While the participant recognition and labeling process is shown and described above as being performed for a single conference participant, by example only, the participant recognition and labeling process may simultaneously or otherwise be performed for other numbers of conference participants. For example, multiple conference participants depicted within a same conference video stream (i.e., at different regions of interest) may be simultaneously or near simultaneously processed using the participant recognition and labeling process shown and described above to cause the concurrent display of annotations for each of those multiple conference participants within the conference video stream.

While not specifically shown, the system 600 enables a participant whose name information is represented within an annotation displayed within a conference video stream to revoke their consent for the participant recognition and labeling process at any time during the video conference. In the event a participant indicates such a revocation request (e.g., using their personal computing device paired to the computing device 608), the annotation will cease to be displayed within the conference video stream, the stored media of the participant will be deleted from the local memory of the computing device 608, and the system will cease to perform recognition or otherwise track them during the remainder of the video conference.

In some cases, one or more conference participants depicted within a conference video stream may not consent to participate in the participant recognition and labeling process or may otherwise revoke such previously provided consent during a video conference, as described above. In such a case, where other conference participants depicted within the conference video stream remain enrolled in the participant recognition and labeling process, the participants who have not consented or who otherwise no longer consent to that process may appear without annotations provided for them while the other, consenting participants do have annotations.

Figure 14:
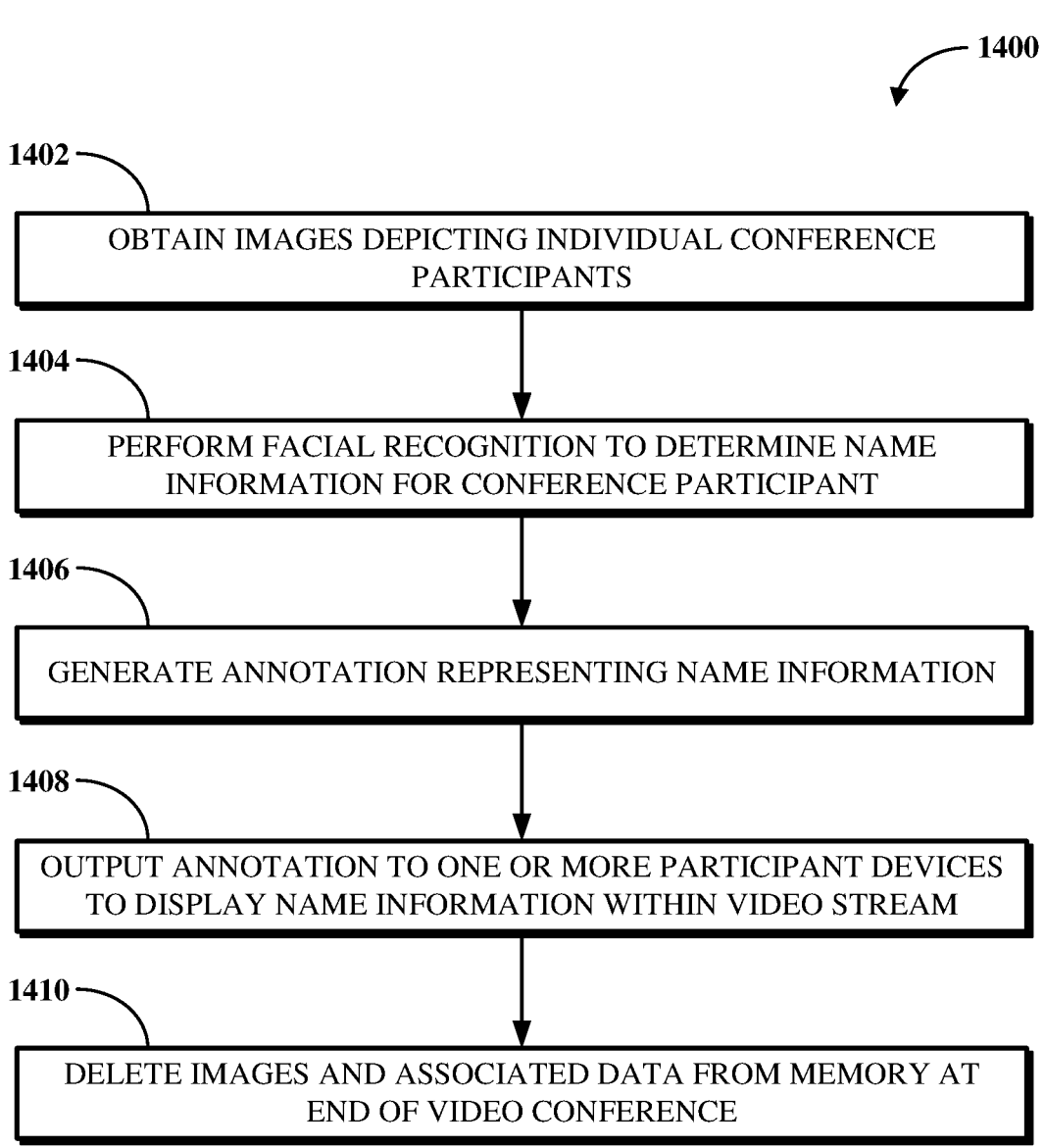
FIG. 14 is a flowchart of an example of a technique for annotating a conference video stream with participant names using facial recognition.

To further describe some implementations in greater detail, reference is next made to examples of techniques which may be performed by or using a conference video stream annotation system usable to annotate a conference video stream with participant names. FIG. 14 is a flowchart of an example of a technique 1400 for annotating a conference video stream with participant names using facial recognition. FIG. 15 is a flowchart of an example of a technique 1500 for annotating a conference video stream with participant names using speech recognition.

The techniques 1400 and 1500 can be executed using computing devices, such as the systems, hardware, and software described with respect to FIGS. 1-13B. The techniques 1400 and 1500 can be performed, for example, by executing a machine-readable program or other computer-executable instructions, such as routines, instructions, programs, or other code. The steps, or operations, of the techniques 1400 and 1500, or another technique, method, process, or algorithm described in connection with the implementations disclosed herein can be implemented directly in hardware, firmware, software executed by hardware, circuitry, or a combination thereof.

For simplicity of explanation, the techniques 1400 and 1500 are each depicted and described herein as a series of steps or operations. However, the steps or operations of the technique 1400 and 1500 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 14, at 1402, images depicting individual conference participants are obtained by a computing device in connection with a video conference. The computing device obtains (e.g., downloads) the images from a data store based on one or more of an identification of the conference participants within a participant list of the video conference or pairings of personal computing devices of the conference participants to the computing device. The images are stored within the data store as part of an enrollment and authorization process for participant recognition and labeling. Alternatively, the images may be obtained from ones of personal computing devices of the conference participants based on one or more of an identification of the conference participants within a participant list of the video conference or pairings of the personal computing devices to the computing device. In either case, obtaining the images includes saving the images to a local memory of the computing device. In some cases, obtaining the images can include validating a quality of an image of the images based on a depiction of a conference participant within the image.

At 1404, a facial recognition process is performed to determine name information for a conference participant depicted within a video stream of the video conference. Performing the facial recognition process includes determining whether there is a match between high dimensional features of an image depicting the conference participant and high dimensional features of an image from the video stream and obtaining the name information from a data store based on the match. For example, performing the facial recognition process can include comparing a first set of high dimensional features determined for an image depicting the conference participant and a second set of high dimensional features determined for an image of the video stream. The data store from which the name information is obtained based on a match determined by the facial recognition process may be the same data store from which the images of the individual conference participants are obtained or a different data store. For example, the name information for a given conference participant may be stored within the data store in connection with the stored image for that given conference participant, and obtaining the name information can include identifying the name information associated with the stored image upon determining the match via the facial recognition process.

At 1406, an annotation representing the name information of the conference participant is generated. Generating the annotation includes generating data configured to visually render the name information within the video stream depicting the conference participant. For example, generating the data configured to visually render the name information within the video stream can include determining location information at which to cause the display of the annotation within the video stream based on a location of a depiction of the conference participant within the video stream.

At 1408, the annotation is output to configure one or more participant devices connected to the video conference to display the name information proximate to a depiction of the conference participant within the video stream. Outputting the annotation can include the computing device including the annotation within then video stream at the location proximate to the depiction of the conference participant, according to the location information determined for the annotation. In such a case, outputting the annotation can include transmitting the video stream including the annotation either to the one or more participant devices or to an server used to facilitate the video conference, which will then transmit the video stream including the annotation to the one or more participant devices. Alternatively, outputting the annotation can include the computing device transmitting the annotation and the location information determined for the annotation, along with the video stream. In such a case, the one or more participant devices that receive the video stream, annotation, and location information can each include the annotation within the video stream, or a server used to facilitate the video conference can include the annotation within the video stream and then transmit the video stream including the annotation to the one or more participant devices.

At 1410, the images and associated data are deleted from the local memory of the computing device at an end of the video conference. Deleting the images and associated data includes deleting information that was stored within the local memory for use with the participant recognition and labeling process performed by the technique 1400. For example, the associated data may include the location information determined for annotations, name information determined for conference participants, and/or the like.

In some implementations, the technique 1400 can include manipulating or otherwise modifying annotations output, or the outputting of such annotations, during the video conference. For example, the technique 1400 can include determining during the video conference that a conference participant for whom an annotation is output is no longer detected within the video stream within which they were previously depicted and, based on that determination, causing the one or more participant devices to remove the annotation from display. Because the image of the conference participant and other information used for the facial recognition process may remain stored within the local memory of the computing device during the video conference, in the event the conference participant is detected once again within the video stream, the annotation can be reintroduced within (i.e., re-included within or otherwise added back into) the video stream during the video conference.

Referring next to FIG. 15, at 1502, voiceprints representing speech of individual conference participants are obtained by a computing device in connection with a video conference. The computing device obtains (e.g., downloads) the voiceprints from a data store based on one or more of an identification of the conference participants within a participant list of the video conference or pairings of personal computing devices of the conference participants to the computing device. The voiceprints are stored within the data store as part of an enrollment and authorization process for participant recognition and labeling. Alternatively, the voiceprints may be obtained from ones of personal computing devices of the conference participants based on one or more of an identification of the conference participants within a participant list of the video conference or pairings of the personal computing devices to the computing device. In either case, obtaining the voiceprints includes saving the voiceprints to a local memory of the computing device. In some cases, obtaining the voiceprints can include validating a quality of a voiceprint of the voiceprints based on one or more audio signal components of the voiceprint, such as amplitude, wavelength, or frequency data of the voiceprint.

At 1504, a speech recognition process is performed to determine name information for a conference participant represented within an audio segment captured during the video conference. Performing the speech recognition process includes determining whether there is a match between high dimensional features of a voiceprint representing speech of the conference participant and high dimensional features of an audio segment from the video conference and obtaining the name information from a data store based on the match. For example, performing the speech recognition process can include comparing a first set of high dimensional features determined for a voiceprint representing speech of the conference participant and a second set of high dimensional features determined for an audio segment of the video conference. The data store from which the name information is obtained based on a match determined by the speech recognition process may be the same data store from which the voiceprints of the individual conference participants are obtained or a different data store. For example, the name information for a given conference participant may be stored within the data store in connection with the stored voiceprint for that given conference participant, and obtaining the name information can include identifying the name information associated with the stored voiceprint upon determining the match via the speech recognition process.

At 1506, an annotation representing the name information of the conference participant is generated. Generating the annotation includes generating data configured to visually render the name information within a video stream depicting the conference participant. For example, generating the data configured to visually render the name information within the video stream can include determining location information at which to cause the display of the annotation within the video stream based on a location of a depiction of the conference participant within the video stream. Where the video stream is blank (e.g., because the camera used for the computing device at the physical space where the conference participant is located is disabled, unplugged, malfunctioning, physically covered, or simply turned off), the location information may be randomly determined, determined as a center or near center location of a user interface tile for the video stream, or determined based on some arrangement of the conference participants attending the video conference via that computing device.

At 1508, the annotation is output to configure one or more participant devices connected to the video conference to display the name information proximate to a depiction of the conference participant within the video stream. Outputting the annotation can include the computing device including the annotation within then video stream at the location proximate to the depiction of the conference participant, according to the location information determined for the annotation. In such a case, outputting the annotation can include transmitting the video stream including the annotation either to the one or more participant devices or to an server used to facilitate the video conference, which will then transmit the video stream including the annotation to the one or more participant devices. Alternatively, outputting the annotation can include the computing device transmitting the annotation and the location information determined for the annotation, along with the video stream. In such a case, the one or more participant devices that receive the video stream, annotation, and location information can each include the annotation within the video stream, or a server used to facilitate the video conference can include the annotation within the video stream and then transmit the video stream including the annotation to the one or more participant devices. In some cases, the annotation may be output when the conference participant is speaking (i.e., while the audio segment representing speech of the conference participant or another audio segment representing speech of the conference participant is captured) to indicate the conference participant as an active speaker during the video conference.

At 1510, the voiceprints and associated data are deleted from the local memory of the computing device at an end of the video conference. Deleting the voiceprints and associated data includes deleting information that was stored within the local memory for use with the participant recognition and labeling process performed by the technique 1500. For example, the associated data may include the location information determined for annotations, name information determined for conference participants, and/or the like.

In some implementations, the technique 1500 can include using the name information determined for the conference participant to indicate the conference participant as the speaker of corresponding speech recorded within a transcript, written caption, conference summary, or other document or writing output during the video conference and/or after the video conference ends. For example, the technique 1500 can include labeling portions of the transcript corresponding to speech of the conference participant with the name information determined for the conference participant. In another example, the technique 1500 can include using the name information to identify the participants that made certain comments within a written summary of the video conference. In yet another example, the technique 1500 can include adding the name information within a written caption depicting speech from the conference participant, which may be output to one or more participant devices during the video conference.

In some implementations of the technique 1400 or the technique 1500, some or all of the annotations may be omitted from a recording of the video conference. For example, an enrollment and authorization process as disclosed herein may include an option to allow users to specify not to include their name information within recordings of video conferences within which their name information annotations are displayed. In another example, a video conference GUI or other GUI may include an option to allow participants to indicate, during a video conference, to not include their displayed name information annotations within a recording of the video conference. When a user or participant indicates to not include their name information within a recording of a video conference, the annotation may either be entirely omitted from the recording or obfuscated (e.g., blurred) within the recording.

The implementations of this disclosure describe methods, systems, devices, apparatuses, and non-transitory computer readable media for conference video stream annotation. In some implementations, a method comprises, a non-transitory computer readable medium stores instructions operable to cause one or more processors to perform operations comprising, and/or a system comprises a memory subsystem storing instructions and processing circuitry configured to execute the instructions for: obtaining, by a computing device used with a video conference, images depicting individual conference participants invited to the video conference; obtaining, by the computing device and as output of a facial recognition process performed based on the images, name information of a conference participant depicted within a video stream captured for the video conference; and outputting, by the computing device, an annotation representing the name information to configure one or more participant devices connected to the video conference to display the name information proximate to a depiction of the conference participant within the video stream.

In some implementations of the method, the non-transitory computer readable medium, and/or the system, outputting the annotation comprises: transmitting, by the computing device, the annotation and location information indicating a location within the video stream at which to display the annotation.

In some implementations of the method, the non-transitory computer readable medium, and/or the system, outputting the annotation comprises: including, by the computing device, the annotation within the video stream at a location proximate to the depiction of the conference participant; and transmitting, by the computing device, the video stream including the annotation.

In some implementations of the method, the non-transitory computer readable medium, and/or the system, obtaining the images comprises: downloading, by the computing device from a data store, an image depicting the conference participant based on one or more of an identification of the conference participant within a participant list of the video conference or a pairing of a personal computing device of the conference participant to the computing device.

In some implementations of the method, the non-transitory computer readable medium, and/or the system, obtaining the images comprises: obtaining, by the computing device, an image depicting the conference participant from a personal computing device of the conference participant based on one or more of an identification of the conference participant within a participant list of the video conference or a pairing of the personal computing device to the computing device.

In some implementations of the method, the non-transitory computer readable medium, and/or the system, obtaining the images comprises: validating a quality of an image of the images based on a depiction of the conference participant within the image.

In some implementations of the method, the non-transitory computer readable medium, and/or the system, obtaining the name information of the conference participant comprises: performing the facial recognition process including determining a match between high dimensional features of an image depicting the conference participant and high dimensional features of an image from the video stream; and obtaining the name information from a data store based on the match.

In some implementations of the method, the non-transitory computer readable medium, and/or the system, the method comprises, the operations comprise, and/or the processing circuitry is configured to execute the instructions for: storing, by the computing device, the images and associated data within a local memory for use with the video conference; and deleting, by the computing device, the images and the associated data from the local memory at an end of the video conference.

In some implementations of the method, the non-transitory computer readable medium, and/or the system, the method comprises, the operations comprise, and/or the processing circuitry is configured to execute the instructions for: determining, by the computing device during the video conference, that the conference participant is no longer detected within the video stream; and based on the determination that the conference participant is no longer detected within the video stream, causing, by the computing device, the one or more participant devices to remove the annotation from display.

In some implementations of the method, the non-transitory computer readable medium, and/or the system, the video stream is captured using a camera located within a physical space and the computing device is located within the physical space.

In some implementations of the method, the non-transitory computer readable medium, and/or the system, the method comprises, the operations comprise, and/or the processing circuitry is configured to execute the instructions for: performing the facial recognition process by comparing a first set of high dimensional features determined for an image depicting the conference participant and a second set of high dimensional features determined for an image of the video stream.

In some implementations of the method, the non-transitory computer readable medium, and/or the system, the method comprises, the operations comprise, and/or the processing circuitry is configured to execute the instructions for: prompting for input to confirm the name information prior to outputting the annotation.

In some implementations of the method, the non-transitory computer readable medium, and/or the system, the images and other information associated with the individual conference participants are stored within a local memory of the computing device during the video conference and deleted from the local memory at an end of the video conference.

In some implementations of the method, the non-transitory computer readable medium, and/or the system, the method comprises, the operations comprise, and/or the processing circuitry is configured to execute the instructions for: determining location information describing a location within the video stream at which to cause the display of the annotation based on a location of the depiction of the conference participant within the video stream.

In some implementations of the method, the non-transitory computer readable medium, and/or the system, a data store from which the images are obtained may be included.

In some implementations of the method, the non-transitory computer readable medium, and/or the system, obtaining the images comprises: determining that personal computing devices for the individual conference participants are paired to a computing device within a physical space within which the individual conference participants are located; and determining that the individual conference participants are included in a participant invite list for the video conference.

In some implementations of the method, the non-transitory computer readable medium, and/or the system, the images are uploaded for use during the video conference as part of an enrollment and authorization process performed by each of the individual conference participants.

In some implementations of the method, the non-transitory computer readable medium, and/or the system, the images are stored within the memory subsystem during the video conference and deleted from the memory subsystem at an end of the video conference.

The implementations of this disclosure describe methods, systems, devices, apparatuses, and non-transitory computer readable media for conference video stream annotation. In some implementations, a method comprises, a non-transitory computer readable medium stores instructions operable to cause one or more processors to perform operations comprising, and/or a system comprises a memory subsystem storing instructions and processing circuitry configured to execute the instructions for: obtaining, by a computing device used with a video conference, voiceprints representing speech of individual conference participants invited to the video conference; obtaining, by the computing device and as output of a speech recognition process performed based on the voiceprints, name information of a conference participant whose speech is represented within an audio segment captured during the video conference; and outputting, by the computing device, an annotation representing the name information to configure one or more participant devices connected to the video conference to display the name information proximate to a depiction of the conference participant within a video stream depicting the conference participant.

In some implementations of the method, the non-transitory computer readable medium, and/or the system, outputting the annotation comprises: transmitting, by the computing device, the annotation and information indicating a location within the video stream at which to display the annotation.

In some implementations of the method, the non-transitory computer readable medium, and/or the system, outputting the annotation comprises: including, by the computing device, the annotation within the video stream at a location proximate to the depiction of the conference participant; and transmitting, by the computing device, the video stream including the annotation.

In some implementations of the method, the non-transitory computer readable medium, and/or the system, obtaining the voiceprints comprises: downloading, by the computing device from a data store, a voiceprint representing speech of the conference participant based on one or more of an identification of the conference participant within a participant list of the video conference or a pairing of a personal computing device of the conference participant to the computing device.

In some implementations of the method, the non-transitory computer readable medium, and/or the system, obtaining the voiceprints comprises: obtaining, by the computing device, a voiceprint representing speech of the conference participant from a personal computing device of the conference participant based on one or more of an identification of the conference participant within a participant list of the video conference or a pairing of the personal computing device to the computing device.

In some implementations of the method, the non-transitory computer readable medium, and/or the system, obtaining the voiceprints comprises: validating a quality of a voiceprint of the voiceprints based on one or more audio signal components of the voiceprint.

In some implementations of the method, the non-transitory computer readable medium, and/or the system, obtaining the name information of the conference participant comprises: performing the speech recognition process including determining a match between high dimensional features of a voiceprint representing speech of the conference participant and high dimensional features of the audio segment; and obtaining the name information from a data store based on the match.

In some implementations of the method, the non-transitory computer readable medium, and/or the system, the method comprises, the operations comprise, and/or the processing circuitry is configured to execute the instructions for: storing, by the computing device, the voiceprints and associated data within a local memory for use with the video conference; and deleting, by the computing device, the voiceprints and the associated data from the local memory at an end of the video conference.

In some implementations of the method, the non-transitory computer readable medium, and/or the system, outputting the annotation comprises: outputting the annotation to indicate the conference participant as an active speaker during the video conference.

In some implementations of the method, the non-transitory computer readable medium, and/or the system, outputting the annotation comprises: removing the annotation when the conference participant is other than an active speaker during the video conference.

In some implementations of the method, the non-transitory computer readable medium, and/or the system, the method comprises, the operations comprise, and/or the processing circuitry is configured to execute the instructions for: recording the name information of the conference participant in connection with speech of the conference participant within a transcript of the video conference.

In some implementations of the method, the non-transitory computer readable medium, and/or the system, the audio segment is captured using a microphone located within a physical space and the computing device is located within the physical space.

In some implementations of the method, the non-transitory computer readable medium, and/or the system, the method comprises, the operations comprise, and/or the processing circuitry is configured to execute the instructions for: performing the speech recognition process by comparing a first set of high dimensional features determined for a voiceprint representing speech of the conference participant and a second set of high dimensional features determined for the audio segment.

In some implementations of the method, the non-transitory computer readable medium, and/or the system, the method comprises, the operations comprise, and/or the processing circuitry is configured to execute the instructions for: prompting for input to confirm the name information prior to outputting the annotation.

In some implementations of the method, the non-transitory computer readable medium, and/or the system, the voiceprints and other information associated with the individual conference participants are stored within a local memory of the computing device during the video conference and deleted from the local memory at an end of the video conference.

In some implementations of the method, the non-transitory computer readable medium, and/or the system, the method comprises, the operations comprise, and/or the processing circuitry is configured to execute the instructions for: determining location information describing a location within the video stream at which to cause the display of the annotation based on a location of the depiction of the conference participant within the video stream.

In some implementations of the method, the non-transitory computer readable medium, and/or the system, obtaining the voiceprints comprises: determining that personal computing devices for the individual conference participants are paired to a computing device within a physical space within which the individual conference participants are located; and determining that the individual conference participants are included in a participant invite list for the video conference.

In some implementations of the method, the non-transitory computer readable medium, and/or the system, the voiceprints are uploaded for use during the video conference as part of an enrollment and authorization process performed by each of the individual conference participants.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

obtaining, by a computing device used with a video conference, voiceprints representing speech of individual conference participants invited to the video conference, wherein the voiceprints are stored within a local memory of the computing device for use with the video conference;

obtaining, by the computing device and as output of a speech recognition process performed based on the voiceprints, name information of a conference participant whose speech is represented within an audio segment captured during the video conference;

outputting, by the computing device, an annotation representing the name information to configure one or more participant devices connected to the video conference to display, throughout the video conference independent of whether the conference participant is an active speaker, the name information proximate to a depiction of the conference participant within a video stream depicting the conference participant;

deleting, by the computing device based on an indication to end the video conference, the voiceprints from the local memory; and ending, by the computing device, the video conference after the deletion of the voiceprints.

2. The method of claim 1, wherein outputting the annotation comprises:

transmitting, by the computing device, the annotation and information indicating a location within the video stream at which to display the annotation.

3. The method of claim 1, wherein outputting the annotation comprises:

including, by the computing device, the annotation within the video stream at a location proximate to the depiction of the conference participant; and transmitting, by the computing device, the video stream including the annotation.

4. The method of claim 1, wherein obtaining the voiceprints comprises:

downloading, by the computing device from a data store, a voiceprint representing speech of the conference participant based on one or more of an identification of the conference participant within a participant list of the video conference or a pairing of a personal computing device of the conference participant to the computing device.

5. The method of claim 1, wherein obtaining the voiceprints comprises:

obtaining, by the computing device, a voiceprint representing speech of the conference participant from a personal computing device of the conference participant based on one or more of an identification of the conference participant within a participant list of the video conference or a pairing of the personal computing device to the computing device.

6. The method of claim 1, wherein obtaining the voiceprints comprises:

validating a quality of a voiceprint of the voiceprints based on one or more audio signal components of the voiceprint.

7. The method of claim 1, wherein obtaining the name information of the conference participant comprises:

performing the speech recognition process including determining a match between high dimensional features of a voiceprint representing speech of the conference participant and high dimensional features of the audio segment; and obtaining the name information from a data store based on the match.

8. The method of claim 1, comprising:

storing, by the computing device, data associated with the voiceprints within the local memory; and deleting, by the computing device, the data associated with the voiceprints from the local memory based on the ending of the video conference.

9. The method of claim 1, wherein outputting the annotation comprises:

outputting the annotation to indicate the conference participant as an active speaker during the video conference.

10. The method of claim 1, wherein outputting the annotation comprises:

removing the annotation when the conference participant is other than an active speaker during the video conference.

11. The method of claim 1, comprising:

recording the name information of the conference participant in connection with speech of the conference participant within a transcript of the video conference.

12. The method of claim 1, wherein the audio segment is captured using a microphone located within a physical space and the computing device is located within the physical space.

13. A non-transitory computer readable medium storing instructions operable to cause one or more processors to perform operations comprising:

obtaining, by a computing device used with a video conference, voiceprints representing speech of individual conference participants invited to the video conference, wherein the voiceprints are stored within a local memory of the computing device for use with the video conference;

obtaining, by the computing device and as output of a speech recognition process performed based on the voiceprints, name information of a conference participant whose speech is represented within an audio segment captured during the video conference;

outputting, by the computing device, an annotation representing the name information to configure one or more participant devices connected to the video conference to display, throughout the video conference independent of whether the conference participant is an active speaker, the name information proximate to a depiction of the conference participant within a conference video stream depicting the conference participant;

deleting, by the computing device based on an indication to end the video conference, the voiceprints from the local memory; and ending, by the computing device, the video conference after the deletion of the voiceprints.

14. The non-transitory computer readable medium of claim 13, the operations comprising:

performing the speech recognition process by comparing a first set of high dimensional features determined for a voiceprint representing speech of the conference participant and a second set of high dimensional features determined for the audio segment.

15. The non-transitory computer readable medium of claim 13, the operations comprising:

prompting for input to confirm the name information prior to outputting the annotation.

16. The non-transitory computer readable medium of claim 13, wherein other information associated with the voiceprints is stored within the local memory of the computing device during the video conference and deleted from the local memory based on the ending of the video conference.

17. A system, comprising:

a memory subsystem storing instructions; and processing circuitry configured to execute the instructions to:

obtain voiceprints representing speech of individual conference participants invited to a video conference, wherein the voiceprints are stored within a local memory of the memory subsystem for use with the video conference;

obtain, as output of a speech recognition process performed based on the voiceprints, name information of a conference participant whose speech is represented within an audio segment captured during the video conference;

output an annotation representing the name information to configure one or more participant devices connected to the video conference to display, throughout the video conference independent of whether the conference participant is an active speaker, the name information proximate to a depiction of the conference participant within a conference video stream depicting the conference participant;

delete, based on an indication to end the video conference, the voiceprints from the local memory; and end the video conference after the deletion of the voiceprints.

18. The system of claim 17, wherein the processing circuitry is configured to execute the instructions to:

determine location information describing a location within the video stream at which to cause the display of the annotation based on a location of the depiction of the conference participant within the video stream.

19. The system of claim 17, wherein, to obtain the voiceprints, the processing circuitry is configured to execute the instructions to:

determine that personal computing devices for the individual conference participants are paired to a computing device within a physical space within which the individual conference participants are located; and determine that the individual conference participants are included in a participant invite list for the video conference.

20. The system of claim 17, wherein the voiceprints are uploaded for use during the video conference as part of an enrollment and authorization process performed by each of the individual conference participants.

\* \* \* \* \*